United States Patent [19]
Hall

[11] Patent Number: 5,884,248
[45] Date of Patent: Mar. 16, 1999

[54] BUILD MESSAGE COMMUNICATION SYSTEM UTILIZING DATA TABLES CONTAINING MESSAGE DEFINING DATA AND CORRESPONDING CODES

[75] Inventor: Tracy R. Hall, Santa Clara, Calif.

[73] Assignee: Casio Computer Co., Ltd., Santa Clara, Calif.

[21] Appl. No.: 631,760

[22] Filed: Apr. 10, 1996

[51] Int. Cl.[6] .............................. G06F 17/20; G06F 17/28
[52] U.S. Cl. .................... 704/8; 707/536; 340/825.44; 455/31.2
[58] Field of Search .................. 704/1, 2, 3, 7, 704/8, 9; 707/530, 531, 532, 536, 535; 340/825.44; 455/31.2, 31.3

[56] References Cited

U.S. PATENT DOCUMENTS

| | | | |
|---|---|---|---|
| 4,382,256 | 5/1983 | Nagata | 340/825.44 |
| 4,870,402 | 9/1989 | DeLuca et al. | 340/825.44 |
| 4,974,191 | 11/1990 | Amirghodsi et al. | 704/8 |
| 5,001,633 | 3/1991 | Fukumochi et al. | 704/6 |
| 5,182,772 | 1/1993 | Karas et al. | 380/49 |
| 5,268,839 | 12/1993 | Kaji | 704/3 |
| 5,434,777 | 7/1995 | Luciw | 704/9 |
| 5,664,126 | 9/1997 | Hirakawa et al. | 345/329 |
| 5,675,817 | 10/1997 | Moughanni et al. | 704/3 |
| 5,693,076 | 12/1997 | Kaemmerer | 607/59 |

FOREIGN PATENT DOCUMENTS

| | | |
|---|---|---|
| 0 150 273 A2 | 8/1985 | European Pat. Off. . |
| 0 441 385 A1 | 8/1991 | European Pat. Off. . |
| 0 716 401 A1 | 6/1996 | European Pat. Off. . |
| 07067163 | 3/1995 | Japan . |

*Primary Examiner*—Joseph Thomas
*Attorney, Agent, or Firm*—Skjerven,Morrill,MacPherson, Franklin and Friel; Alan H. MacPherson; Fabio E. Marino

[57] ABSTRACT

A communication paging device whereby the coding mechanism allows messages to be constructed using bit-stream syntax blocks. Each syntax block is designated with a category such as a sentence format, subject, verb, location modifier, location, date modifier, date, time, and etc. Within each syntax block category is a set of variable code values that will translate into a screen display of alphanumeric characters to form both words and graphical screen elements. By using the coding mechanism, the syntax blocks are concatenated to form meaningful sentences with words arranged in a logical syntax order for that particular language. The conjugation of words in the sentence are easier and require less Boolean type functions to arrive at the conjugate word. The use of syntax blocks gives flexibility to allow conversion of statement sentences to question sentences, and question sentences into statement sentences. The use of syntax blocks also allow sentence structure conversion from a pager of one language into a receiving pager of a different language. The use of syntax blocks also reduces the amount of memory, and transmission bandwidth needed to transmit the data.

17 Claims, 23 Drawing Sheets

| SYNTAX BLOCK CATEGORY | CODE VALUE | DISPLAY | SUB-CODE VALUE |
|---|---|---|---|
| FORMAT | [0] | STATEMENT | |
| | [1] | QUESTION | |
| STATEMENT FORMAT | [0] | NEGATIVE STATEMENT | |
| | [1] | POSITIVE STATEMENT | |
| QUESTION FORMAT | [0] | WHERE . . . | |
| | [1] | WHEN . . . | |
| | [2] | WHERE AND WHEN . . . | |
| | [3] | {NO PREFIX} | |
| CATEGORY | [0] | SUBJECT : THE MEETING<br>VERB : TO BE | |
| | [1] | SUBJECT : THE PACKAGE<br>VERB : TO BE | |
| | [2] | SUBJECT : I / YOU<br>VERB : TO BE | |
| | [3] | SUBJECT : I / YOU<br>VERB : TO CALL | |
| | [4] | SUBJECT : TBD<br>VERB : TBD | |
| | [5] | SUBJECT : TBD<br>VERB : TBD | |
| | [6] | SUBJECT : TBD<br>VERB : TBD | |
| | [7] | SUBJECT : TBD<br>VERB : TBD | |
| SUBCATEGORY (SUBJECT) | [0] | I AM / I CALL | |
| | [1] | YOU ARE / YOU CALL | |
| VERB TENSE | [0] | PAST | |
| | [1] | PRESENT | |
| | [2] | FUTURE | |
| | [3] | SUBJUNCTIVE | |
| | [4] | CONDITIONAL | |

FIG.3

| SYNTAX BLOCK CATEGORY | CODE VALUE | DISPLAY | SUB-CODE VALUE |
|---|---|---|---|
| LOCATION CLAUSE | [0] | {NO PHRASE, NO PREFIX} | [0] AT THE |
| | [1] | OFFICE | [1] AT MY |
| | [5] | HOME | [2] AT YOUR |
| | [9] | SCHOOL | [3] AT |
| | [13] | SITE | |
| | [17] | HOSPITAL | |
| | [21] | RESTAURANT | |
| | [25] | {CUSTOM STRING, NO PREFIX} | |
| | [26] | {CUSTOM STRING, WITH PREFIX} | |
| | [30] | HERE {NO PREFIX} | |
| | [31] | THERE {NO PREFIX} | |
| DATE MODIFIER | [0] | {NO PREFIX} | |
| | [1] | LAST | |
| | [2] | THIS | |
| | [3] | NEXT | |
| DATE UNIT | [0] | {NO THERE PHRASE} | |
| | [1] | RELATIVE DAY | |
| | [2] | DAY OF WEEK | |
| | [3] | MONTH OF YEAR | |
| | [4] | YEAR | |

FIG.4

| SYNTAX BLOCK CATEGORY | CODE VALUE | DISPLAY | | WEEK | MONTH | YEAR |
|---|---|---|---|---|---|---|
| DATE VALUE | [0] | | | | | |
| | [1] | YESTERDAY | | MONDAY | JANUARY | |
| | [2] | TODAY | | TUESDAY | FEBRUARY | |
| | [3] | TOMORROW | | WEDNESDAY | MARCH | |
| | [4] | | | THURSDAY | APRIL | |
| | [5] | | | FRIDAY | MAY | |
| | [6] | | | SATURDAY | JUNE | |
| | [7] | | | SUNDAY | JULY | |
| | [8] | | | | AUGUST | |
| | [9] | | | | SEPTEMBER | |
| | [10] | | | | OCTOBER | |
| | [11] | | | | NOVEMBER | |
| | [12] | | | | DECEMBER | |

FIG. 5

| SYNTAX BLOCK CATEGORY | CODE VALUE | DISPLAY | SUB-CODE VALUE |
|---|---|---|---|
| TIME MODIFIER | [0] | AM | |
| | [1] | PM | |
| TIME, HOURS | [0] | {NO PREFIX} | |
| | [1] | @1:XX | |
| | [2] | @2:XX | |
| | [3] | @3:XX | |
| | [4] | @4:XX | |
| | [5] | @5:XX | |
| | [6] | @6:XX | |
| | [7] | @7:XX | |
| | [8] | @8:XX | |
| | [9] | @9:XX | |
| | [10] | @10:XX | |
| | [11] | @11:XX | |
| | [12] | @12:XX | |
| TIME, MINUTES | [0] | XX:00 | |
| | [1] | XX:15 | |
| | [2] | XX:30 | |
| | [3] | XX:45 | |

FIG.6

| FORMAT | STATEMENT (QUESTION) FORMAT | CATEGORY | SUBCATEGORY (SUBJECT) |
|---|---|---|---|

| VERB TENSE | LOCATION CLAUSE | DATE MODIFIER | DATE UNIT | DATE VALUE | TIME MODIFIER |
|---|---|---|---|---|---|

| TIME, HOURS | TIME, MINUTES |
|---|---|

FIG.7

MAIN MENU

READ MESSAGE
SEND MESSAGE
MAINTAIN DEVICE

FIG. 9A

READ MESSAGE MENU

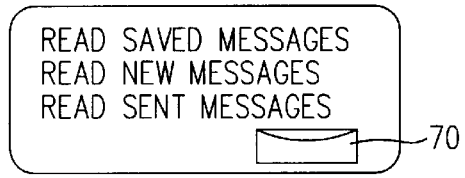
READ SAVED MESSAGES
READ NEW MESSAGES
READ SENT MESSAGES
—70

FIG. 9B

MESSAGE OPTION MENU

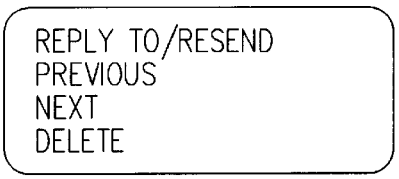
REPLY TO/RESEND
PREVIOUS
NEXT
DELETE

FIG. 9C

REPLY MENU

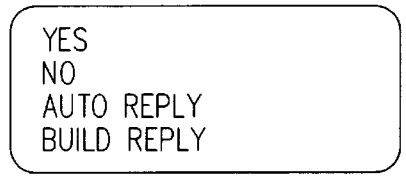
YES
NO
AUTO REPLY
BUILD REPLY

FIG. 9D

SEND MESSAGE MENU

BUILD MESSAGE
SELECT ADDRESS
TRANSMIT MESSAGE

FIG. 9E

BUILD MESSAGE MENU

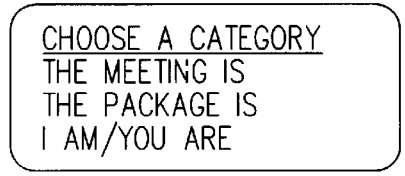
CHOOSE A CATEGORY
THE MEETING IS
THE PACKAGE IS
I AM/YOU ARE

FIG. 9F

STATEMENT/QUESTION MENU

DO YOU WANT A
STATEMENT OR A
QUESTION
ABOUT A MEETING ?

FIG.11A

QUESTION FORMAT MENU

WHERE . . .
WHEN . . .
WHERE AND WHEN . . .
{NO PREFIX}

FIG.11B

CONJUGATE MESSAGE MENU

IS THE MEETING

{AT LOCATION}
{INSERT DATE/TIME}

FIG.11C

| WILL THE MEETING BE AT YOUR OFFICE {INSERT DATE/TIME} ? | WILL THE MEETING BE AT YOUR OFFICE TUESDAY @10:30 AM ? |

FIG.13A  FIG.13B

BUILD MESSAGE COMMUNICATION SYSTEM UTILIZING DATA TABLES CONTAINING MESSAGE DEFINING DATA AND CORRESPONDING CODES

BACKGROUND OF THE INVENTION

1. Field of the Invention

The present invention relates to a build message communication system and more particularly to a message communication terminal device such as a portable two-way pager device used in a two-way paging system.

2. Description of the Related Art

As an example of a prior art message communicating pager, a paging receiver with display is disclosed in U.S. Pat. No. 4,382,256 (Nagata). The prior art uses a coding mechanism that reads message data from a message table with a fixed column order to designate syntax order. Under each table column, there is a list of words consisting of a mixed category of subject, verb, location, date, and time. Therefore, certain same words need to be repeated across multiple columns in order to construct statement sentence messages as well as question sentence messages because syntax order is different between statement sentences and question sentences. This also opens the possibility that non-meaningful sentence structures can be created, therefore resulting in possible miscommunication.

There is another prior art in which it is required that each sentence be constructed by keying in each character one at a time to build words that will then build the sentence message. This requires more manual interaction from the user, opens the possibility that spelling errors may occur, requires more memory to be allocated and built into the paging device, uses more data and thus, increases the bandwidth needed for transmission making the process costly and time consuming.

The prior art has disadvantages in building messages. The usual method of building a sentence structure has typically made the use of fixed tables where the first word in the sentence is extracted from the first column in the table, the second word in the sentence is extracted from the second column, and so forth. This sets up a rigid sentence structure where the syntax order is fixed; for example, into subject noun that goes into the first column, verb that goes into the second column, location modifier that goes into the third column, location that goes into the fourth column, date modifier that goes into the fifth column, date that goes into the sixth column, and time that goes into the seventh column. If any sentence should fall out of this rigid syntax order, the sentence can still be constructed, but with the addition of repeated words placed into each column category of the table to make up for the different syntax order. This results in a clutter of words using up valuable memory space, and requiring the coding mechanism to search each category for the correct word, then determining if that word is even available in that category, and then conjugating that word. This method becomes a time-consuming process.

The prior art has disadvantages in conjugating messages. The conjugation of subject nouns with their respective verbs, locations, dates, times, modifiers, format, negation, etc. is difficult, if not impossible, because there would be too many repeated words to conjugate, and there are no fixed categories to direct the coding mechanism to find and reference as to which words are to be conjugated. The manner in how the words are conjugated also means relying on other related words within the sentence, and if there are no fixed categories under which the related words are grouped, then the coding mechanism cannot find and reference the subject noun that directs how the other words are to be conjugated. This requires using many Boolean type functions, that therefore makes conjugation of words a difficult and time-consuming task.

The prior art has disadvantages in transposing messages. The prior art coding mechanism also makes converting statement sentences into question sentences, and question sentences into statement sentences difficult. Relating specifically to a two-way communication system such as a two-way (receiving/transmitting) paging system, formulating the reply to a question statement would require the user to rebuild a reply statement response word by word because the coding mechanism cannot detect nor translate the meaning of the question statement. The user needs to accommodate this weakness in the coding mechanism by telling the paging device exactly what words and what syntax order to use to build the message. Thus, the user spends valuable time manually keying in information.

The prior art has disadvantages in translating messages. The use of a fixed table coding mechanism makes language translation difficult. If any sentence requires more than the designated number of columns allocated for this particular table, as in the case of translation into another language which may have a different and lengthy syntax structure, then the sentence cannot be constructed completely and may lose its meaning. The prior art coding mechanism would only allow for words in the columns to be translated, but this does not result in translating a meaningful message, as conjugation, prefixes, suffixes, and syntax order vary between languages. Again, miscommunication may result, or the sentence simply cannot be translated.

SUMMARY OF THE INVENTION

The present invention is directed towards a paging device using a meaning-based syntax block coding mechanism to transmit and receive messages.

The present invention can be a portable unit to be carried with an individual person or vehicle, or a station based unit to reside at a location.

Also, the present invention can have a variety of embodiments such as a paging receiver, two-way paging receiver/transmitter, computer platform, etc. that transmit messages over a communication network.

The present invention is a communication pager for use in the home, office, school, hospital, laboratory, etc., either onsite or traveling offsite.

The present invention is useful for alerting another party of an event, confirming an event, for eliciting a response to contact the caller, and other events where the receiving user does not necessarily have to simultaneously respond with the caller in order to get the message.

It is an object of the present invention to provide an improved paging device by allowing the user to build meaningful messages, to transpose messages to formulate automatic replies, and to translate messages between different languages. The user does not necessarily need to learn another language to read a message from another language because the paging device translates that message into the user's paging device language.

The paging device allows the user to read new, saved, and sent messages. The paging device also allows the user to build message sentences, select a paging number, and send the message. Moreover, the paging device allows the user to add entries to the phonebook, check battery level, and other system functions.

The paging device is preset with common message sentences for faster and convenient message building and replying, but with open parameters that enable the user to enter personal information for added flexibility.

According to the present invention, there is provided a build message communication system comprising a transmitter device for transmitting message defining data including category data indicative of a category of a message and grammatical data indicative of a grammatical feature of the message, and a receiver device for receiving the message defining data transmitted from said transmitter device and reproducing the message based on the message defining data received.

According to the present invention, the coding mechanism uses juxtaposable syntax blocks to form meaningful sentences based upon proper syntax order that allows the user to read messages, build statement sentences and question sentences with automatic conjugation of words to send messages, to formulate an automatic reply to an incoming message, and to translate messages from one language pager into a different language pager.

The present invention builds meaningful messages and reduces the chance of building non-meaningful sentences, uses less memory space, uses a coding mechanism comprised of syntax blocks, branching paths, and Boolean functions to transpose sentences to formulate automatic responses, and translates messages between different languages by reading universal code values that the paging device screen displays as sentences of a different language.

The present invention also reduces user interaction so that instead of typing in one character at a time to form words and build a sentence, the user simply selects buttons containing words or groups of words (phrases) to build a sentence. This also has the advantage that more information can be appended with fewer bits of data information and in less time.

The present invention has advantages in building messages. The ability to build meaningful but concise sentences is made possible through preprogrammed words and phrases found in each syntax block category. The user selects from the list of choices, and presses a button that corresponds to that choice to enter the selection. Essentially, the user selects a choice, which brings the user to a sub-level menu list of choices. The levels of submenus continue until a completed sentence is constructed. The use of syntax blocks serve as a reference point so that Boolean functions are possible.

The present invention has advantages in conjugating messages. With the use of Boolean functions, the amount of user typing is reduced as the coding mechanism simply processes a series of Yes or No multiple-choice responses entered by the user. The coding mechanism gives the ability to conjugate sentences by adding word suffixes, or to modify the body of a word in order to fit the sentence context and tense. The branching paths allow the coding mechanism to route responses toward syntax blocks and append words and phrases that are contained in each syntax block category. Contracting words to fit the conversational language is also made possible.

The present invention has advantages in transposing messages. The ability to build a message as a response to another message is made possible through the invoking of the Boolean functions that perform the juxtapositions of the syntax block order. For example, in the present invention only the basic format of the message needs to be inverted (question sentence to statement sentence, or statement sentence to question sentence), along with the subject, if any ("you" to "I", or "I' to "you') and the location ("at my" to "at your", or "at your" to "at my"), to provide most of the structure for an answer.

The present invention has advantages in translating messages. The ability to translate a message into another language message is made possible through reading a universal set of code values that correspond to the alphanumeric characters for that particular language in a screen display. The use of syntax blocks allows a logical and organized order to be set up for code values which then allow another paging device to read the same code values and use Boolean functions to structure and display the message as translated for that particular paging device's language.

The very same transmission of data from an English paging device can send the same message to another language paging device without having the sending user modify the sentence. Also, a French paging device, for example, can send that same message from the English paging device to yet another language paging device. The automatic translation by the paging device has the added benefit in that a user need not necessarily learn another language in order to read messages because the paging device translates the messages. Thus, communication is only limited by the language screen displays that are built into a paging device. In an embodiment in a personal computer, the coding mechanism can be a very powerful tool to allow more complex messages to be sent, read, and translated, especially through electronic mail linkages to communication networks.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 shows a relationship between values of the syntax block codes shown in FIG. 7 and definitions thereof;

FIG. 4 shows a relationship between values of the syntax block codes shown in FIG. 7 and definitions thereof;

FIG. 5 shows a relationship between values of the syntax block codes shown in FIG. 7 and definitions thereof;

FIG. 6 shows a relationship between values of the syntax block codes shown in FIG. 7 and definitions thereof;

FIG. 7 shows a data format of a message formed of a series of syntax block codes;

FIGS. 9A to 9F show examples of various menu displays included in the flowchart of FIG. 8;

FIGS. 11A to 11C show examples of various menu displays included in the flowchart of FIG. 10;

FIGS. 13A and 13B show examples of various menu displays included in the flowchart of FIG. 12;

DETAILED DESCRIPTION OF THE PREFERRED EMBODIMENTS

A preferred embodiment of a build message communication system according to the present invention will now be described with reference to the accompanying drawings. A two-way pager will be described hereinafter as the first embodiment of the build message communication system according to the present invention. However, as described later, the present invention is not limited to the two-way pager system.

The two-way pager terminal device is comprised of two parts: a coding mechanism and a user interface.

Figure 1:
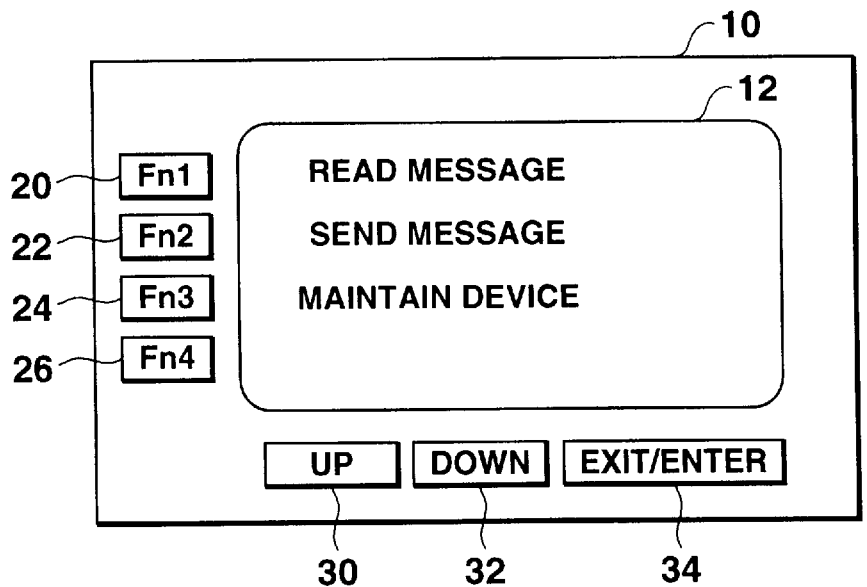
FIG. 1 illustrates a front view of a first embodiment of a two-way pager according to the present invention.

FIG. 1 shows the user interface of the two-way pager according to the first embodiment. The user interface is based upon a hardware housing 10. The housing 10 is in the form of a portable paging unit, a computer system, etc. The housing 10 can be constructed of material such as plastic, glass, metal, wood, composites, etc. that is suitable for its particular embodiment. The housing protects the interior parts of the paging device as well as offers a surface with which the user can interact.

Input mechanisms such as buttons, keyboard keys, mouse pointers, etc. allow the user to input data to the coding mechanism to construct, send and receive messages, maintain an address phonebook, check the battery level, etc. The function of the buttons depend on the displayed menu selections. One embodiment of the present invention has four function buttons such as function-1 (Fn 1) button 20 to read messages, function-2 (Fn 2) button 22 to send messages, function-3 (Fn 3) button 24 to maintain the device, and function-4 (Fn 4) button 26 to be used as an open parameter. An up arrow button 30 scrolls up to the top of the list of choices and a down arrow button 32 scrolls down to the bottom of the list of choices. An exit/enter button 34 is used to back out of the present screen display 12. Other embodiments of the input mechanisms can include any combination of function buttons, function buttons and keyboard, function buttons and mouse, keyboard, mouse, or function buttons and keyboard and mouse.

The user interface 10 also has a screen display 12 to display messages, button function messages, and graphical icons. The messages to be read or sent are displayed on the screen display 12 alphanumerically. Four lines (the fourth line is blank in this example) are displayed in alphanumeric characters and diacritical marks, and correspond to the function buttons. The graphical icons include, for example, a new message icon (70; shown in FIG. 9B) indicating that a new message has been received, a battery level icon indicating the battery energy level of the paging device, and up arrow icon and down arrow icon (scroll triangles) indicating if there are more choices available than what the screen can display. The screen display 12 may be formed of an LCD, a CRT, etc.

Figure 2:
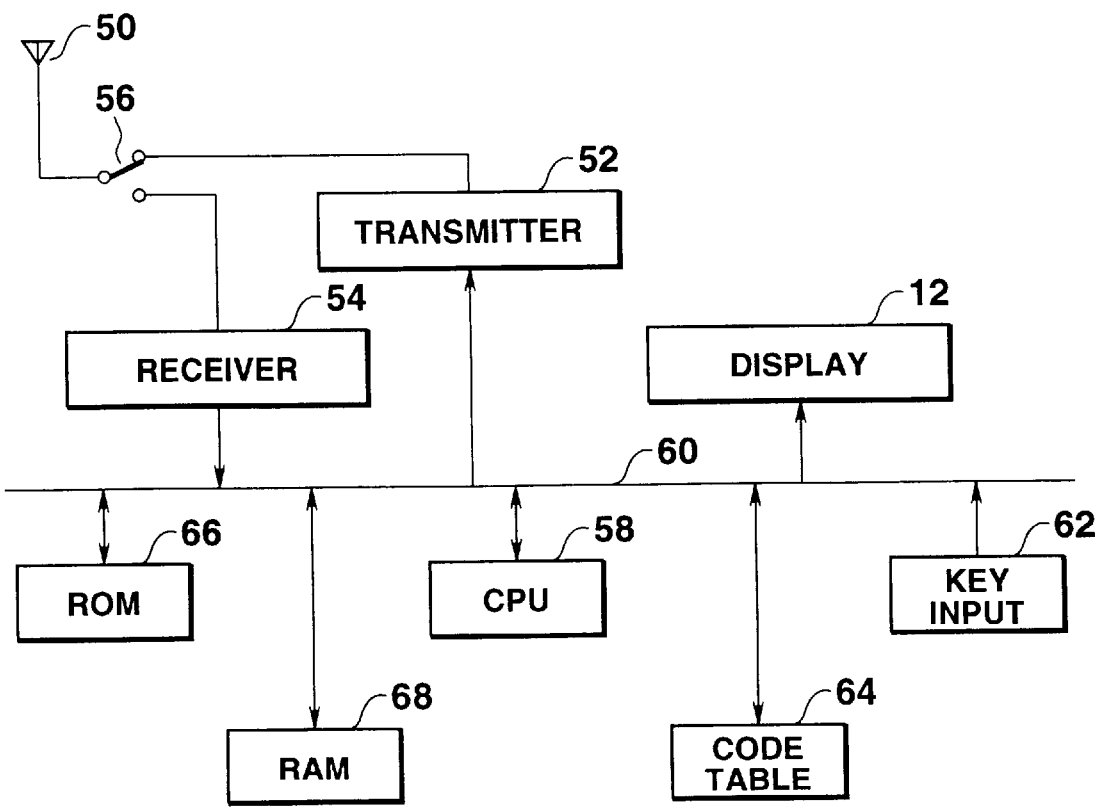
FIG. 2 is a block diagram showing a circuit configuration of the first embodiment.

FIG. 2 shows a block diagram of a circuit configuration of the two-way pager of the first embodiment. A transmitter/reception antenna 50 is connected to a transmitter 52 or a receiver 54 through a selector switch 56. Transmitter 52 transmits messages to a base station of the two-way pager system (not shown) via a radio channel. The messages transmitted from the base station are received by the receiver 54. A CPU (central processing unit) 58 is provided to control the whole operation including a message building process, a message reading process, and a message sending process, etc. The transmitter 52, the receiver 54, and the CPU 58 are connected to a system bus 60. The screen display 12 and the key input mechanism 62 are connected to the system bus 60. Further, a code table 64, a read only memory (ROM) 66, and a random access memory (RAM) 68 are connected to the system bus 60. The code table 64 stores codes of the messages communicated in this embodiment.

The coding mechanism which is the second part of the present invention will be described hereinafter. The coding mechanism is the core of the present invention, and comprises syntax blocks which encode the meanings of various parts of a message in the form of a code stream, and a mechanism which translates the code stream input into alphanumeric screen displays.

Given the syntax block structure, the coding mechanism can derive words, conjugations of words, and concatenation of words into a logical sentence syntax order. The phrases, words, and diacritical marks are preprogrammed into the paging device so that all syntax block combinations consistently lead to an appropriate phrase, word, or diacritical mark.

An important point of the coding scheme is that it is independent of the language used; i.e., the meanings of the codes can be expressed in different languages. For paging devices of a language other than English, the coding mechanism reads the same numeric code stream and uses a similar mechanism to translate the numeric code into a screen display for that particular language, as built into the receiving page device. Therefore, according to the present invention, an English speaker can send an English message by using an English pager device, and a French speaker can receive the message by using a French pager device in which the received message is displayed in French.

The basic coding mechanism is a series of codes used to express the meaning of a particular desired message, and a mechanism for concatenating strings of phrases, words, and diacritical marks to display the content of a message. The code table 64 (FIG. 2) stores the code table as shown in FIGS. 3 to 6. The table comprises four columns: syntax block category, code value, display, sub-code value. The syntax block category is comprised of, as shown in FIG. 7, format, statement (question) format, category, subcategory (subject), verb tense, location clause, date modifier, date unit, date value, time modifier, time (hours), and time (minutes).

Most of the elements in the table are descriptions of semantic characteristics of a message; for example, whether the message is a question, and what form of a question. The intent of selecting from preprogrammed choices is to simplify and expedite message building, and guarantee consistent communication, rather than trying to accommodate all possible sentence variations in a given language.

The value of assigning code values to what a word or phrase means is that the present invention is not directly dependent on tables of ASCII characters. This results, amongst other things, in the present invention being applicable to communication between different languages. The present invention also makes creation of messages straight-forward, without forcing the user to refer to large tables of data to construct a message character-by-character or word-by-word.

FIGS. 3 to 6 show a list of the preprogrammed choices for each syntax block. The code values are assigned to each phrase, word, and diacritical mark and these codes are the information that direct the coding mechanism how to perform. It is to be noted that the subcategory only applies to some categories; in cases where it does not apply, the value is unused and undefined. The code values for the location clause illustrates how values may be selected to help in compressing the resulting code. The location clause code is derived by adding the value of the primary code value (office, site, custom, etc.) to the value of the secondary code (at the, at my, etc.), resulting in a value between zero (0) and thirty one (31), inclusive. This is not required by the build message mechanism, but does show how the invention lends itself to compression.

The following shows examples with the corresponding message display and code values. The steps to display a message are as follows:

1) Read in the code stream and extract the category and subcategory values. These two values determine the subject noun, and the verb, of the message.
2) Extract format, statement/question format and verb tense values from the code stream. These, between them, determine the proper word order and verb conjugation of the message.
3) Extract the location clause value from the code stream. This adds a location prepositional phrase to the message, if indicated. If a custom location is indicated, extract a 12-character ASCII word from the code stream.
4) Extract the date and time clause values from the code stream. These add a date/time prepositional phrase to the message, if indicated.

Three examples of code values and displays are described below.

EXAMPLE 1

English Question Sentence

Screen display string: WILL THE MEETING BE AT YOUR OFFICE TUESDAY @3:00 PM?

Syntax block category order:
1. Format [1]
2. Question format [3]
3. Category [0]
4. Subcategory [X](is unused and undefined in this example)
5. Verb tense [2]
6. Location [3]
7. Date modifier [0]
8. Date unit [2]
9. Date value [2]
10. Time modifier [1]
11. Time (hours) [3]
12. Time (minutes) [0]

Code values:
[1]& [3]& [0]& [X]& [2]& [3]& [0]& [2]& [2]& [1]& [3]& [0]

Binary code stream:
1.11.000.X.010.00011.00.010.0010.1.0011.00

EXAMPLE 2

English Statement Sentence

Screen display string: THE MEETING WILL BE AT MY OFFICE TUESDAY @3:00 PM.

Syntax block category order:
1. Format [0]
2. Statement format [1]
3. Category [0]
4. Subcategory [X]
5. Verb tense [2]
6. Location [2]
7. Date modifier [0]
8. Date unit [2]
9. Date value [2]
10. Time modifier [1]
11. Time (hours) [3]
12. Time (minutes) [0]

Code values:
[0]& [1]& [0]& [X]& [2]& [2]& [0]& [2]& [2]& [1]& [3]& [0]

Binary code stream:
0.01.000.X.010.00010.00.010.0010.1.0011.00

EXAMPLE 3

French Statement Sentence

Screen display string: LA RENCONTRE SERA AS MON BUREAU MARDI @15:00

Syntax block category order:
1. Format [0]
2. Statement format [3]
3. Category [0]
4. Subcategory [X]
5. Verb tense [2]
6. Location [2]
7. Date modifier [0]
8. Date unit [2]
9. Date value [2]
10. Time modifier [1]

11. Time (hours) [3]
12. Time (minutes) [0]
Code values:
[0]& [3]& [0]& [X]& [2]& [2]& [0]& [2]& [2]& [1]& [3]& [0]
Binary code stream:
0.11.000.X.010.00010.00.010.0010.1.0011.00

The code values are read by the coding mechanism to determine which phrases, words, or diacritical marks will be displayed. Also, the Boolean functions determine where to direct the flow order of the syntax blocks along the branching paths. It will be obvious to those skilled in the art that the process of making these Boolean functions can be executed in various ways. For example, all decisions about word selection/order could be made with a series of IF . . . THEN . . . ELSE constructs, such as:

```
IF (CATEGORY == THE MEETING IS)
   THEN IF (FORMAT == STATEMENT)
      THEN IF (STATEMENT FORMAT == POSITIVE)
         THEN IF (VERB TENSE == PAST)
            SUBJECT AND VERB = The meeting was;
         ELSE IF (VERB TENSE == PRESENT)
            SUBJECT AND VERB == The meeting is;
         ELSE . . .
         END IF
      ELSE
         THEN IF (VERB TENSE == PAST)
            SUBJECT AND VERB = The meeting wasn't;
         ELSE IF (VERB TENSE == PRESENT)
            SUBJECT AND VERB = The meeting isn't;
         ELSE . . .
         END IF
   ELSE
      THEN IF (QUESTION FORMAT == WHERE)
         THEN IF (VERB TENSE == PAST)
            SUBJECT AND VERB = Where was the meeting;
         ELSE IF (VERB TENSE == PRESENT)
            SUBJECT AND VERB = Where is the meeting;
            ELSE . . .
         END IF
      ELSE IF (QUESTION FORMAT == WHEN)
         THEN IF (VERB TENSE == PAST)
            SUBJECT AND VERB = When was the meeting;
         ELSE IF (VERB TENSE == PRESENT)
            SUBJECT AND VERB = When is the meeting;
            ELSE . . .
         END IF
         ELSE . . .
         END IF
      END IF
   ELSE IF (CATEGORY == I/YOU CALL)
      THEN . . .
```

It is to be noted that the order and ranking of the decisions made would be different for each language to be displayed. Alternatively, the phrases could mostly be encoded into a series of tables, and the various code values used as offsets into these tables. Again, the exact data in the tables, and the order of use of the various code values and offsets would be different for each language to be displayed. The present invention presented here is not dependent on the precise mechanism used to interpret the code stream; rather, the present invention is the code mechanism, values and approach to encoding, and the capabilities they provide.

As an illustration of the display resulting from a code stream input, the following shows the syntax structure to build an English statement sentence for EXAMPLE 2.

[Format (s)]+[Category]+[Verb tense and sense]+[Location modifier]+[Location]+[Data modifier]+[Data unit & value]+[Time]+[Time modifier]+[Diacritical mark]

The following illustrates how syntax block code values generally correspond to the above syntax structure.

[0][3]+[0] THE MEETING (IS)+[2] WILL BE+[1] AT MY+[1] OFFICE+[0]+[2]&[3] TUESDAY+[3]&[0]@3:00+[1] PM+[0]

The following is a syntax structure of the syntax block categories to build an English question sentence for EXAMPLE 1.

[Format (s)]+[Verb tense]+[Subcategory]+[Verb (positive or negative)]+[Location modifier]+[Location]+[Date modifier]+[Date]+[Time]+[Time modifier]+[Diacritical mark]

The following is a syntax structure of the syntax block code values to build an English question sentence for the above syntax structure.

[0][3]+[1] WILL+[0] THE MEETING+[1] BE+[2]AT YOUR+[1] OFFICE+[0]+[1] TUESDAY+[3]&[0] @3:00+[1] PM+[0]?

The mechanism used to display these messages, if based on IF . . . THEN . . . ELSE structure, is shown as follows.

```
GET CATEGORY FROM CODE STREAM INPUT
IF (CATEGORY == 0)    /* THE MEETING (TO BE) */
THEN
  GET FORMAT FROM CODE STREAM INPUT
  IF (FORMAT == 0)    /* STATEMENT */
    THEN
      GET STATEMENT FORMAT FROM CODE STREAM INPUT
      IF (STATEMENT FORMAT == 3)    /* POSITIVE */
        THEN
        GET VERB TENSE FROM CODE STREAM INPUT
        IF (VERB TENSE == 2)
          SUBJECT AND VERB == THE MEETING WILL BE;
        END IF
      END IF
    END IF
END IF
GET LOCATION CLAUSE FROM CODE STREAM INPUT
IF (LOCATION CLAUSE > 0 & LOCATION CLAUSE < 25) THEN
    IF (0 < LOCATION CLAUSE < 5)
      LOCATION STRING == OFFICE
    END IF
END IF
GET LOCATION MODIFIER FROM LOCATION CLAUSE
IF (LOCATION MODIFIER == 1)
    LOCATION STRING == AT MY + LOCATION STRING
END IF
GET DATE UNIT FROM CODE STREAM INPUT
IF (DATE UNIT == 2) THEN
    GET DATE VALUE FROM CODE STREAM INPUT
    IF (DATE VALUE == 2) THEN
       DATE STRING == TUESDAY
    END IF
END IF
GET DATE MODIFIER FROM CODE STREAM INPUT
IF (DATE MODIFIER == 0) THEN
    DATE STRING ==   + DATE STRING
END IF
GET TIME HOURS FROM CODE STREAM INPUT
IF (TIME HOURS == 3) THEN
    TIME STRING = 3:
END IF
GET TIME MINUTES FROM CODE STREAM INPUT
IF (TIME MINUTES == 0) THEN
    TIME STRING = TIMESTRING + 00
END IF
GET TIME MODIFIER FROM CODE STREAM INPUT
IF (TIME MODIFIER == 1) THEN
    TIME STRING = TIME STRING + PM
END IF
IF (FORMAT == 0) THEN
    MESSAGE STRING = subject And verb + LOCATION STRING + TIME STRING
    MESSAGE STRING = MESSAGE STRING +
END IF
```

The following are various examples of English statement messages formed of [Format+Category]+[Verb tense & sense]+[Location modifier]+[Location]+[Date modifier (unused)]+[Date unit & value]+[Date unit & value]+[Time]+[Diacritical mark].

[THE MEETING] [IS] [AT THE] [OFFICE] [FRIDAY] [@5:00 PM] [.]
[THE MEETING] [WILL BE] [AT THE] [OFFICE] [FRIDAY] [@5:00 PM] [.]
[THE MEETING] [WAS] [AT THE] [OFFICE] [FRIDAY] [@5:00 PM] [.]
[THE MEETING] [ISN'T] [AT MY] [HOME] [TUESDAY] [@2:00 PM] [.]
[THE PACKAGE] [WONT BE] [AT MY] [HOME] [TUESDAY] [@2:00 PM] [.]
[THE PACKAGE] [WASN'T] [AT MY] [HOME] [TUESDAY] [@2:00 PM] [.]
[THE MEETING] [IS] [AT YOUR] [SITE] [WEDNESDAY] [@9:30 AM] [.]
[THE MEETING] [WILL BE] [AT YOUR] [SITE] [WEDNESDAY] [@9:30 AM] [.]
[THE MEETING] [WAS] [AT YOUR] [SITE] [WEDNESDAY] [@9:30AM] [.]
[I] [AM] [AT THE] [CLUB] [TODAY] [@6:15 PM] [.]
[I] [WILL BE] [AT THE] [CLUB] [TODAY] [@6:15 PM] [.]
[I] [WAS] [AT THE] [CLUB] [TODAY] [@6:15 PM] [.]
[YOU] [AREN'T] [AT THE] [PLANT] [TOMORROW] [@8:45 AM] [.]
[YOU] [WON'T BE] [AT THE] [PLANT] [TOMORROW] [@8:45 AM] [.]
[YOU] [WEREN'T] [AT THE] [PLANT] [YESTERDAY] [@8:45 AM] [.]

The following are various examples in English question messages formed of [Format+Verb tense]+[Category & subcategory]+[Location modifier]+[Location]+[Date modifier]+[Date]+[Time]+[Diacritical mark].

[IS] [THE MEETING] [AT THE] [OFFICE] [FRIDAY] [@5:00 PM] [?]
[WILL (BE)] [THE MEETING BE] [AT THE] [OFFICE] [NEXT] [FRIDAY] [@5:00 PM] [?]
[WAS] [THE MEETING] [AT THE] [OFFICE] [LAST] [FRIDAY] [@5:00 PM] [?]
[IS] [THE MEETING] [AT YOUR] [SITE] [WEDNESDAY] [@9:30 AM][?]
[WILL (BE)] [THE MEETING BE] [AT YOUR] [SITE] [NEXT] [WEDNESDAY] [@9:30 AM] [?]
[WAS] [THE MEETING] [AT YOUR] [SITE] [WEDNESDAY] [@9:30 AM] [?]
[AM] [I] [AT THE] [CLUB] [TODAY] [@6:15 PM] [?]
[WILL BE] [I] [AT THE] [CLUB] [TODAY] [@6:15 PM] [?]
[WAS] [I] [AT THE] [CLUB] [TODAY] [@6:15 PM] [?]
[WHERE IS] [THE MEETING] [TODAY] [?]
[WHERE WILL (BE)] [THE MEETING BE] [NEXT] [FRIDAY] [?]
[WHERE WAS] [THE MEETING] [LAST] [MONTH] [?]
[WHEN IS] [THE MEETING] [AT YOUR] [SITE] [?]
[WHEN WILL (BE)] [THE MEETING BE] [AT] [HOSPITAL] [?]
[WHEN WAS] [THE MEETING] [AT THE] [SCHOOL] [?]
[WHERE & WHEN IS] [THE MEETING] [?]
[WHERE & WHEN WILL (BE)] [THE MEETING BE] [?]
[WHERE & WHEN WAS] [THE MEETING] [?]
[COULD (BE)] [THE MEETING BE] [AT YOUR] [OFFICE] [@2:30 PM] [?]
[SHOULD (BE)] [THE MEETING BE] [AT YOUR] [OFFICE] [@2:30 PM] [?]
[WHERE IS] [THE PACKAGE] [?]
[WHERE WILL (BE)] [THE PACKAGE BE] [?]
[WHERE WAS] [THE PACKAGE] [?]
[WHEN IS] [THE PACKAGE] [AT YOUR] [OFFICE] [?]
[WHEN WILL (BE)] [THE PACKAGE BE] [AT MY] [HOME] [?]
[WHEN WAS] [THE PACKAGE] [HERE] [?]
[WHERE ARE] [YOU] [?]
[WHERE WILL (BE)] [YOU BE] [?]
[WHERE WERE] [YOU] [?]
[CAN (BE)] [YOU BE] [AT] [HOME] [TODAY] [?]
  [WHERE & WHEN WILL (BE)] [YOU BE] [?]
  [CAN (BE)] [THE MEETING BE] [AT MY] [OFFICE] [NEXT] [MONDAY] [@9:45 AM] [?]

It is to be noted that if the question starts with "where" (i.e., the question format is 0), then the location clause is unused (after all, the location is what is being asked). Similarly, if the question starts with "when", the date/time clauses are unused.

Coding mechanism to conjugate messages will be described hereinafter. Conjugating messages is comprised of incorporating the right verb & tense for the category and subcategory, and constructing words or phrases as deemed appropriate for the language.

The process uses Boolean functions in a series of YES or NO responses to a set of instructions. For example, to conjugate the correct verb for the category "I AM", the Boolean functions could present the following formula:

```
IF FORMAT = 0
    IF SUBJECT CATERGORY = 0
        THEN VERB = [THE MEETING WAS, THE MEETING IS,
THE MEETING WILL BE, THE MEETING SHOULD BE, THE
MEETING SHOULD BE]
    Else IF CATEGORY = 2
        THEN IF SUBCATEGORY = 0
            VERB = [I WAS, I AM, I WILL BE, I SHOULD BE,
COULD BE]
        ELSE
            VERB = [YOU WERE, YOU ARE, YOU WILL BE, YOU
SHOULD BE, COULD BE]
        END IF
    ELSE . . .
```

The process is useful not only for displaying the results of received codes, but also makes the process of building a message simpler. Unlike the prior art, which requires display of all available words for category, verb, verb tense, etc., the present invention allows for display of only the currently relevant data. One of the embodiments of the present invention guides the user by first asking them to select from a list which category they wish. The user then answers various appropriate questions, such as whether the message is a statement or question, or if a statement is positive or negative. When just two or three queries have been answered, the message can be displayed, as text, properly formed and conjugated. Furthermore, the Boolean functions could then direct the sequence along the proper path to the next set of choices, always forming a proper sentence.

In an example of fitting the verb/noun choice into the proper order, the following two examples show how the noun "THE MEETING" and the verb "TO BE" are used in different positions between a statement sentence and a question sentence.

An example for a syntax structure code value for an English statement sentence.

[0]+[0] THE MEETING+[1] WILL BE+ . . .

An example for a syntax structure code value for an English question sentence.

[1]+[1] WILL+[0] THE MEETING+[1] BE+ . . .

The steps are as follows:

1) The coding mechanism reads the code value for format, statement/question format, category, subcategory, and verb tense, and directs the Boolean functions to display the phrase "THE MEETING WILL BE" for the statement sentence, and split the verb to display "WILL THE MEETING BE" for the question sentence.

2) The coding mechanism continues to read all the code values in the message, and directs the Boolean functions to properly conjugate and contract the words based on the format and subject category of the sentence, such words for:

Verb,
Location modifier,
Location,
Date modifier,
Date,
Time,
Time modifier.

This results in creating meaningful sentences while reducing the chance that nonmeaningful sentences will be created. In essence, the paging device may appear as if it has some intelligence, although the resulting screen displays are preprogrammed, and the decisions are acted upon to YES or NO responses to the user input.

The coding mechanism to transpose messages will be described hereinafter. Transposing messages is the process of automatically changing certain syntax code values, and thus rearranging the position of the sentence elements to follow a different syntax pattern. This transposition is particularly useful for automatically generating replies to messages by converting statement sentences into question sentences, and question sentences into statement sentences.

The process is illustrated in EXAMPLE 1 and EXAMPLE 2 of the code values-and-displays examples. The question "WILL THE MEETING BE AT YOUR OFFICE TUESDAY @3:00 PM?" is transposed to the reply "THE MEETING WILL BE AT MY OFFICE TUESDAY @3:00 PM" by only two changes. The format value is changed from [1] (question) to [0](statement), and the modifier subcode of the location clause is changed from [2](at your) to [1](at my). The rearrangement is all accomplished by the display mechanism.

In all cases, the basic format for a reply is created by transposing at most three values; the format, the subcategory, and the location modifier. The need for some further decisions are recognized by Boolean functions, and appropriate substitutions made. For example, when a statement message has either its location or date/time clause blank (or both) (e.g. THE MEETING IS TODAY.), then an automatically transposed question would ask for the information (e.g. WHERE IS THE MEETING TODAY?). This process not only serves to keep communication on topic, but saves the process of having the user create such a response from scratch. If the user desires a different response/reply, the option is available, but the code values and coding mechanism allow the most likely answer to be generated directly.

The coding mechanism to translate messages will be described hereinafter. Translating messages is displaying a sentence from one language into another and adjusting for word change and syntax order to fit each particular language. The only change necessary to support languages other than English is to change the coding/display mechanisms. The list of choices shown in FIGS. 3 to 6 need not be modified for each particular language; only the resulting displays do.

To translate an English message into a French message, the French paging device reads the code values that are transmitted from the English paging device, and looks up the preprogrammed phrases, words, and diacritical marks that correspond to the code stream input, and repeats the search and display until the entire message is displayed on-screen in French.

An important point is that the message is not translated directly; rather, the code stream is interpreted to display a message in the other language.

The following shows a French syntax order and translation of an English message (THE MEETING WILL BE AT MY OFFICE TUESDAY @3:00 PM).

The steps are as follows:
1) The French paging device's coding mechanism looks up the format code value transmitted by the English paging device, and structures the syntax according to the rules of the French language.
2) The coding mechanism continues to read the code values and displays the French counterpart of the words for:
Statement/Question Format,
Category,
Subcategory,
Verb tense,
Location clause,
Date modifier,
Date,
Hours,
Minutes,
Time modifier.

This results in translating meaningful sentences and making translation even possible. In essence, the paging device may appear as if it has some intelligence, although the resulting screen displays are preprogrammed, and the code stream acted upon by IF . . . THEN . . . ELSE decisions.

Another aspect of the particular coding mechanism represented in the current invention is that a class of messages can benefit from considerable data compression. The coding mechanism as compression will be described hereinafter. The limited choices shown in FIGS. 3 to 6 can be represented in a binary-based code, allowing the message to be sent in a compact, coded form rather than as a stream of ASCII characters.

The information coded by the coding mechanism is communicated between devices as a binary data stream. The stream is constructed by concatenating the code bits (code value binary encoding), representing the code value shown in FIGS. 3 to 6 into a single stream of either 31 or 103 bits, as follows.

| Code Value Name | Code Bits |
| --- | --- |
| Format | 1 |
| Statement/Question Format | 2 |
| Category | 3 |
| Subcategory | 1 |
| Verb Tense | 3 |
| Location Clause | 5 |
| Date Modifier | 2 |
| Date Unit | 3 |
| Date Value | 4 |
| Date Value | 2 |
| Time (Hours) | 1 |
| Time (Minutes) | 2 |
| Time Modifier | 1 |
| Total Message Bits | 31 |
| Optional Custom Location | 72 |
| Worst Case Total | 103 |

The 103-bits code is used in the case of a location clause calling for a custom location string, and the added 72 bits represent 12 ASCII characters. To illustrate how this contributes to compression, the message "THE MEETING WILL BE AT MY OFFICE TUESDAY @3:00 PM." (EXAMPLE 2) will be used. This message contains 51 characters; standard Alphanumeric systems use 7 bits to represent each character, resulting in a message length of 357 bits:

51 (characters/message)×7 (bits/character)=357 (bits/message)

The built message coding mechanism, on the other hand, uses just 31 bits (without a custom location string), regardless of the length of the ASCII equivalent. In the above example, this represents almost a 12-to-1 compression. Even if the message contains a custom location string, ratios of at least 3-to-1 are obtained. For this particular embodiment, in a paging device, this compression directly results in the ability for a paging system to carry more messages, and thus increase subscribers and profits.

The detailed operation will be described with reference to the flowcharts shown in FIG. 8 et seq. When the power of the device is turned on, the screen display 12 displays a main menu at step S1 of FIG. 8. The main menu is comprised of three lines of display; READ MESSAGE, SEND MESSAGE, MAINTAIN DEVICE, as shown in FIG. 9A. If the function-1 button 20 is depressed to select READ MESSAGE, the screen display 12 displays a read message menu at step S2. The read message menu is comprised of four lines of display: READ SAVED MESSAGES, READ NEW MESSAGES, READ SENT MESSAGES, and a new message icon 70 indicating that a new message has been received, as shown in FIG. 9B.

On the read message menu, if the function-2 button 22 is depressed to select READ NEW MESSAGES, the screen display 12 displays a new message at step S3. If the exit/enter button 34 is depressed after reading the new message, the screen display 12 displays a message option menu at step S4. The message option menu is comprised of four lines of display: REPLY TO/RESEND MESSAGE, PREVIOUS MESSAGE, NEXT MESSAGE, DELETE MESSAGE, as shown in FIG. 9C.

On the message option menu, if the function-1 button 20 is depressed to select REPLY, the screen display 12 displays a reply menu at step 5. The reply menu is comprised of four lines of display: YES, NO, AUTO REPLY, BUILD REPLY, as shown in FIG. 9D.

On the other hand, on the main menu, if the function-2 button 22 is depressed to select SEND MESSAGE, the screen display 12 displays a send message menu at step S6. The send message menu is comprised of three lines of display: BUILD MESSAGE, SELECT ADDRESS, TRANSMIT MESSAGE, as shown in FIG. 9E.

On the send message menu, if the function-1 button 20 is depressed to select BUILD MESSAGE, the screen display 12 displays a build message menu at step S7. The build message menu is comprised of four lines of display: CHOOSE A CATEGORY (a heading), THE MEETING IS, THE PACKAGE IS, I AM/YOU ARE, as shown in FIG. 9F.

As described, the user of the present paging unit can easily select suitable options according to the guidance menu display.

Figure 8:
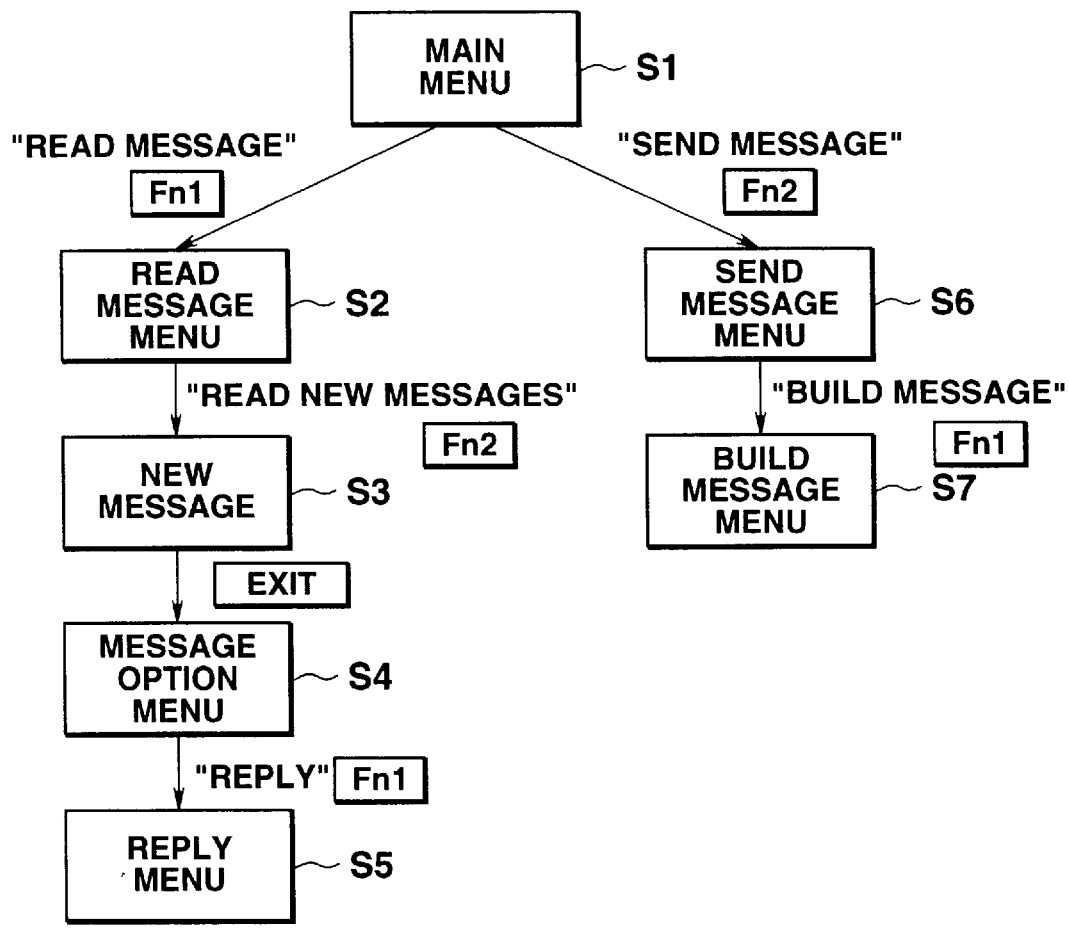
FIG. 8 is a flowchart of the first embodiment showing a change in a menu display.
Figure 10:
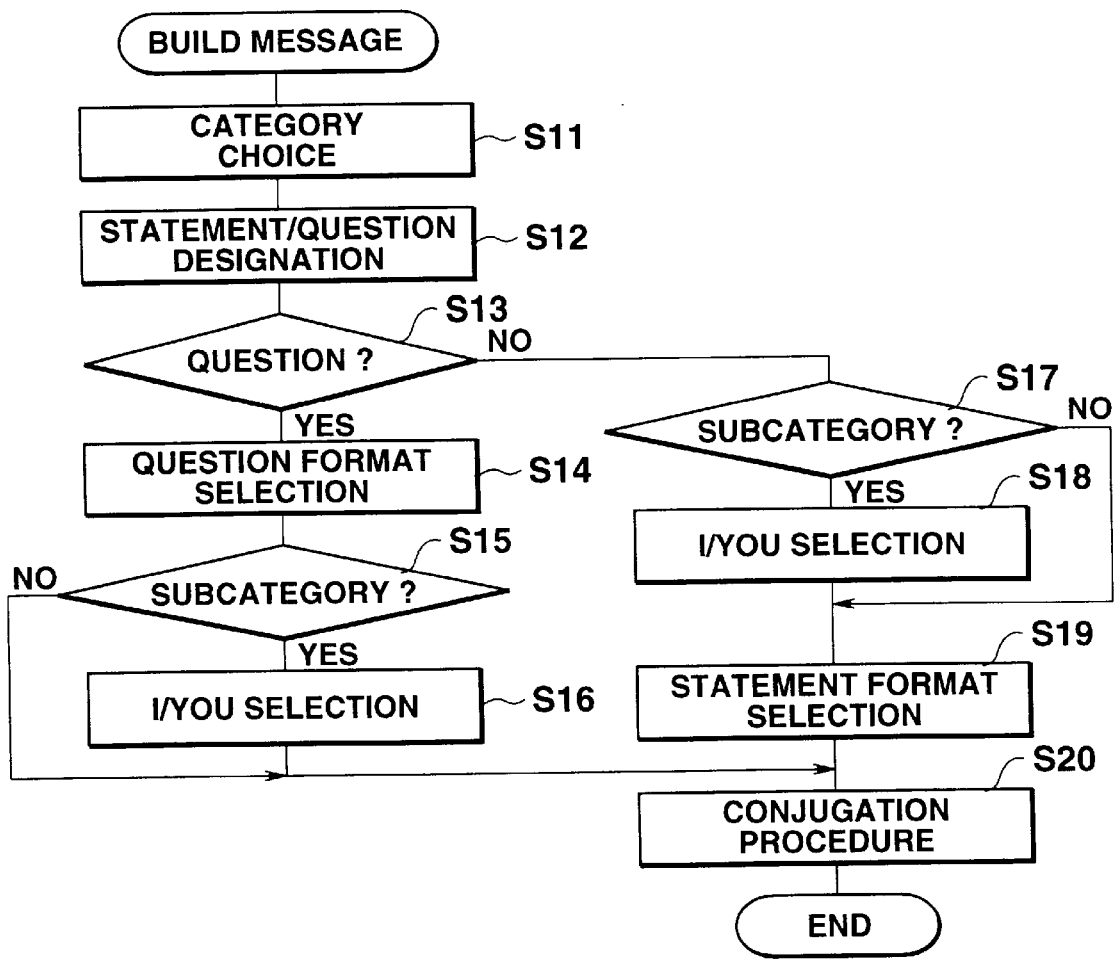
FIG. 10 is a flowchart of the first embodiment showing a "build message" procedure.

FIG. 10 is a flowchart showing a build message procedure of step S7 in FIG. 8. At step S11, a category "THE MEETING IS" is selected on the build message menu (FIG. 9F). At step S12, a statement/question menu as shown in FIG. 11A is displayed. The statement/question menu displays: DO YOU WANT A STATEMENT OR A QUESTION ABOUT A MEETING?. The user designates a statement or a question. It is determined at step S13 whether the question is designated. If the question is designated, a question format menu as shown in FIG. 11B is displayed at step S14. The question format menu displays: WHERE WHEN . . . , WHERE AND WHEN . . . , {NO PREFIX}. It is determined at step S15 whether the subcategory should be designated. If the subcategory should be designated, I/YOU selection is executed at step S16.

If the statement is designated at step S13, it is determined at step S17 whether the subcategory should be designated. If the subcategory should be designated, I/YOU selection is executed at step S18. At step S19, a statement format menu is displayed. After steps S16 and S19, a conjugation procedure is executed at step S20. At step S20, a conjugation message menu as shown in FIG. 11C is displayed. The conjugation message menu displays: IS THE MEETING, {AT LOCATION}, {INSERT DATE/TIME}.

Figure 12:
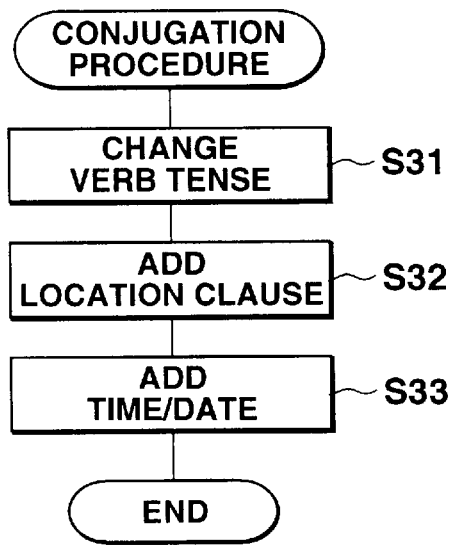
FIG. 12 is a flowchart showing the details of a "conjugation" procedure of FIG. 10.

FIG. 12 is a flowchart showing a conjugation procedure of step S20 in FIG. 10. At step S31, a verb tense (in this example, present) is changed to a future tense. At step S32, a location clause "AT YOUR OFFICE" is added. Therefore, as shown in FIG. 13A, the screen displays: WILL THE MEETING BE AT YOUR OFFICE {INSERT DATE/TIME}?. At step S33, a time/date "TUESDAY @10:30 AM" is inserted. Therefore, as shown in FIG. 13B, the screen displays: WILL THE MEETING BE AT YOUR OFFICE TUESDAY @10:30 AM ?.

As described above, the message can be easily built according to the guidance menu display.

Figure 14:
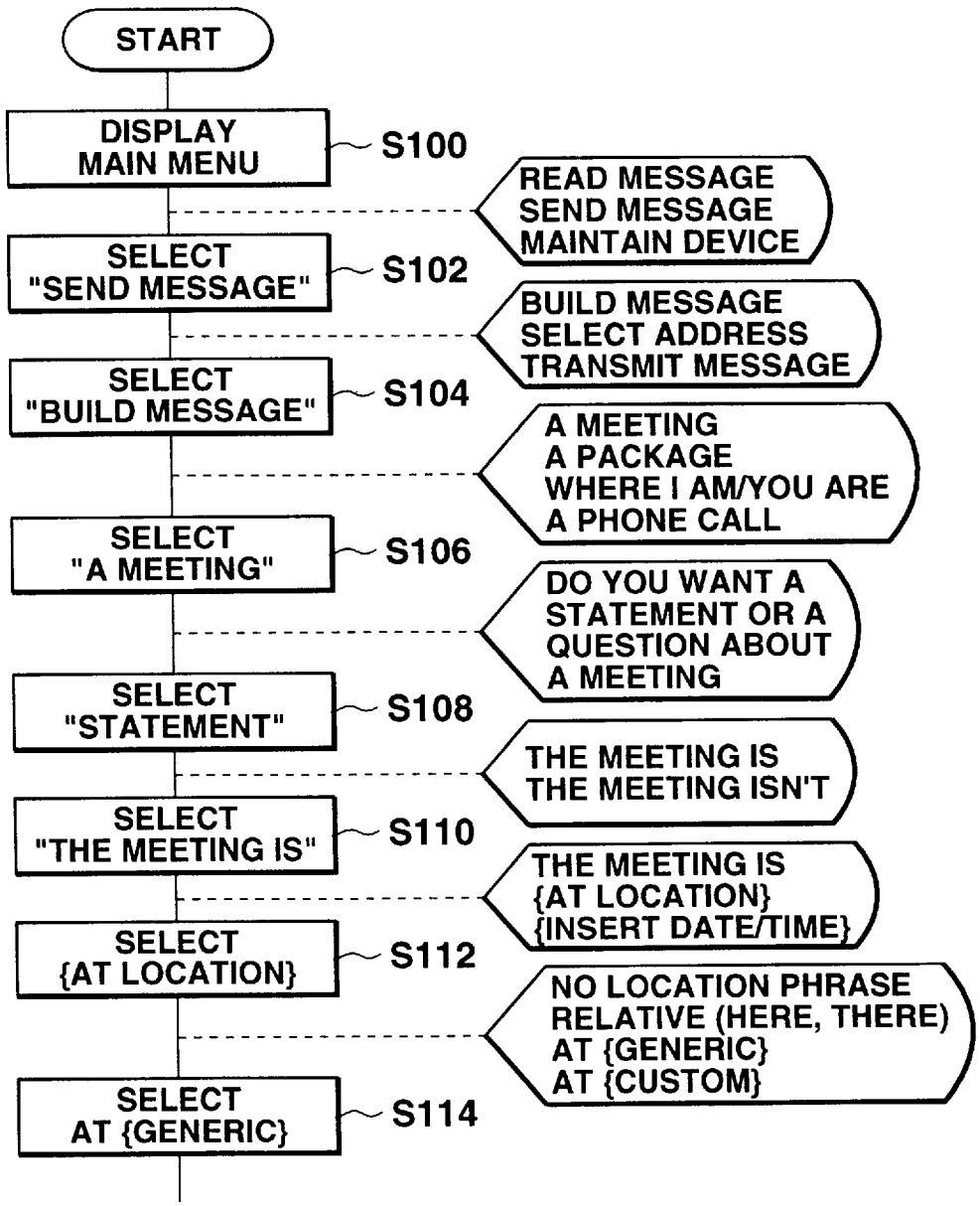
FIG. 14 shows a detailed flowchart showing a change in a menu display in a "build message" procedure.
Figure 15:
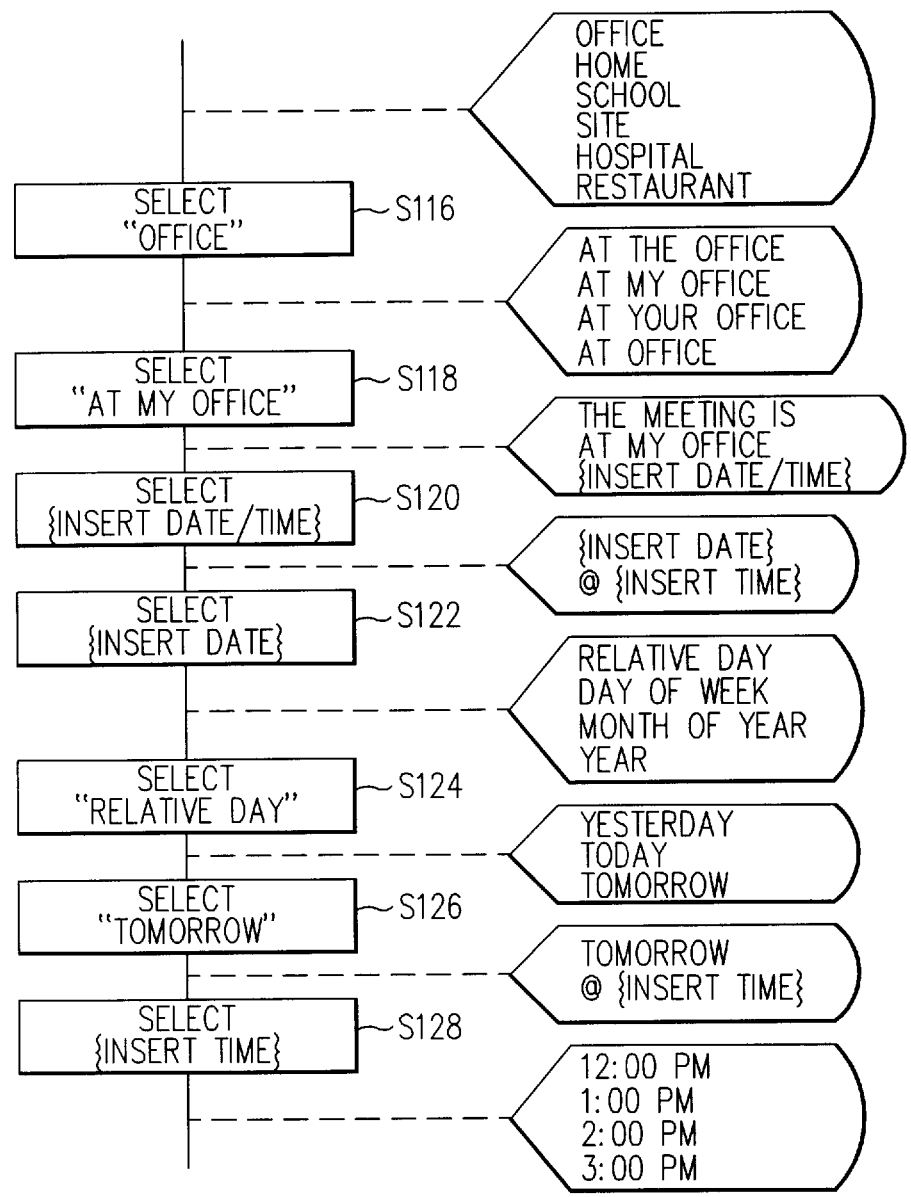
FIG. 15 shows a detailed flowchart showing a change in a menu display in a "build message" procedure.
Figure 16:
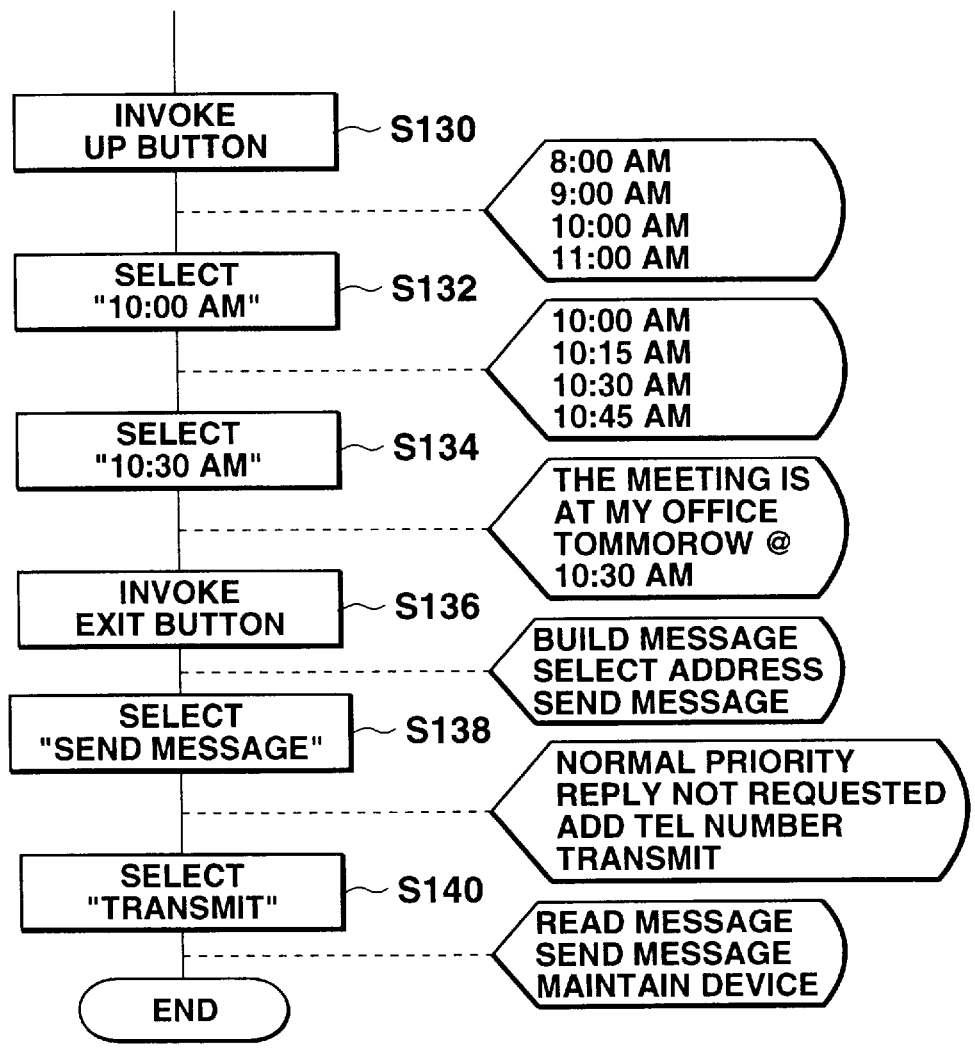
FIG. 16 shows a detailed flowchart showing a change in a menu display in a "build message" procedure.

The detailed process to build a message will be described with reference to a flowchart shown in FIGS. 14 to 16. The process to create a message is done by the user entering functions that are prompted by the paging device. The paging device then responds to the user input and brings up the next submenu list of choices. The various choices made are saved as code values for the final message code. This process is repeated until the message is completed and the code is transmitted. For example, to build a message that displays: THE MEETING IS AT MY OFFICE TOMORROW @10:30 AM, the following steps are taken.

When the user starts the paging device, the main menu is displayed at step S100. The screen displays: READ MESSAGE, SEND MESSAGE, MAINTAIN DEVICE.

The user invokes the function-2 button 22 to select SEND MESSAGE at step S102. The screen displays: BUILD MESSAGE, SELECT ADDRESS, TRANSMIT MESSAGE.

The user invokes the function-1 button 20 to select BUILD MESSAGE at step S104. The screen displays category choices of: A MEETING, A PACKAGE, WHERE I/YOU ARE, A PHONE CALL.

The user invokes the function-2 button 22 to select A MEETING at step S106. This choice is recorded as the value for category. The screen displays: DO YOU WANT A STATEMENT OR A QUESTION ABOUT A MEETING?.

The user invokes the function-2 button 22 to select STATEMENT at step S108. This choice is recorded as the value for format. The screen displays: THE MEETING IS, THE MEETING ISN'T.

The user invokes the function-1 button 20 to select THE MEETING IS at step S110. This choice is recorded as the value for statement format. The screen displays: THE MEETING IS {AT LOCATION} {INSERT DATE/TIME}.

The user invokes the function-3 button 24 to select {AT LOCATION} at step S112. The screen displays: NO LOCATION PHRASE, RELATIVE (HERE, THERE), AT {GENERIC}, AT {CUSTOM}.

The user invokes the function-3 button 24 to select AT {GENERIC} at step S114. The screen displays: OFFICE, HOME, SCHOOL, SITE, HOSPITAL, RESTAURANT.

The user invokes the function-1 button 20 to select OFFICE at step S116. The screen displays: AT THE OFFICE, AT MY OFFICE, AT YOUR OFFICE, AT OFFICE.

The user invokes the function-2 button 22 to select AT MY OFFICE at step S118. This choice is recorded as the value for location clause. The screen displays: THE MEETING IS AT MY OFFICE {INSERT DATE/TIME}.

The user invokes the function-4 button 26 to select {INSERT DATE/TIME} at step S120. The screen displays: {INSERT DATE}, @{INSERT TIME}.

The user invokes the function-1 button 20 to select {INSERT DATE} at step S122. The screen displays: RELATIVE DAY, DAY OF WEEK, MONTH OF YEAR, YEAR.

The user invokes the function-1 button 20 to select RELATIVE DAY at step S124. This choice is recorded as the value for date units. The screen displays: YESTERDAY, TODAY, TOMORROW.

The user invokes the function-3 button 24 to select TOMORROW at step S126. This choice is recorded as the value for date value. The screen displays: TOMORROW, @{INSERT TIME}.

The user invokes the function-2 button 22 to select {INSERT TIME} at step S128. The screen displays: 12:00 PM, 1:00 PM, 2:00 PM, 3:00 PM.

The user invokes the up button 30. The screen displays: 8:00 AM, 9:00 AM, 10:00 AM, 11:00 AM.

The user invokes the function-3 button 24 to select 10:00 AM at step S132. This choice is recorded as the values for time modifier and time hour. The screen displays: 10:00 AM, 10:15 AM, 10:30 AM, 10:45 AM.

The user invokes the function-3 button 24 to select 10:30 AM at step S134. This choice is recorded as the value for time minutes. The screen displays: THE MEETING IS AT MY OFFICE TOMORROW @10:30 AM.

The user invokes the exit button 34 at step S136 to end the build message procedure. The screen displays: BUILD MESSAGE, SELECT ADDRESS, SEND MESSAGE.

The user invokes the function-2 button 22 to select SEND MESSAGE at step S138. The screen displays: NORMAL PRIORITY, REPLY NOT REQUESTED, ADD TELEPHONE NUMBER, TRANSMIT.

The user invokes the function-4 button 26 to select TRANSMIT at step S140. The message thus built is then transmitted to the base station through the transmitter 52 and the antenna 50. The screen display returns to the main menu.

Figure 17:
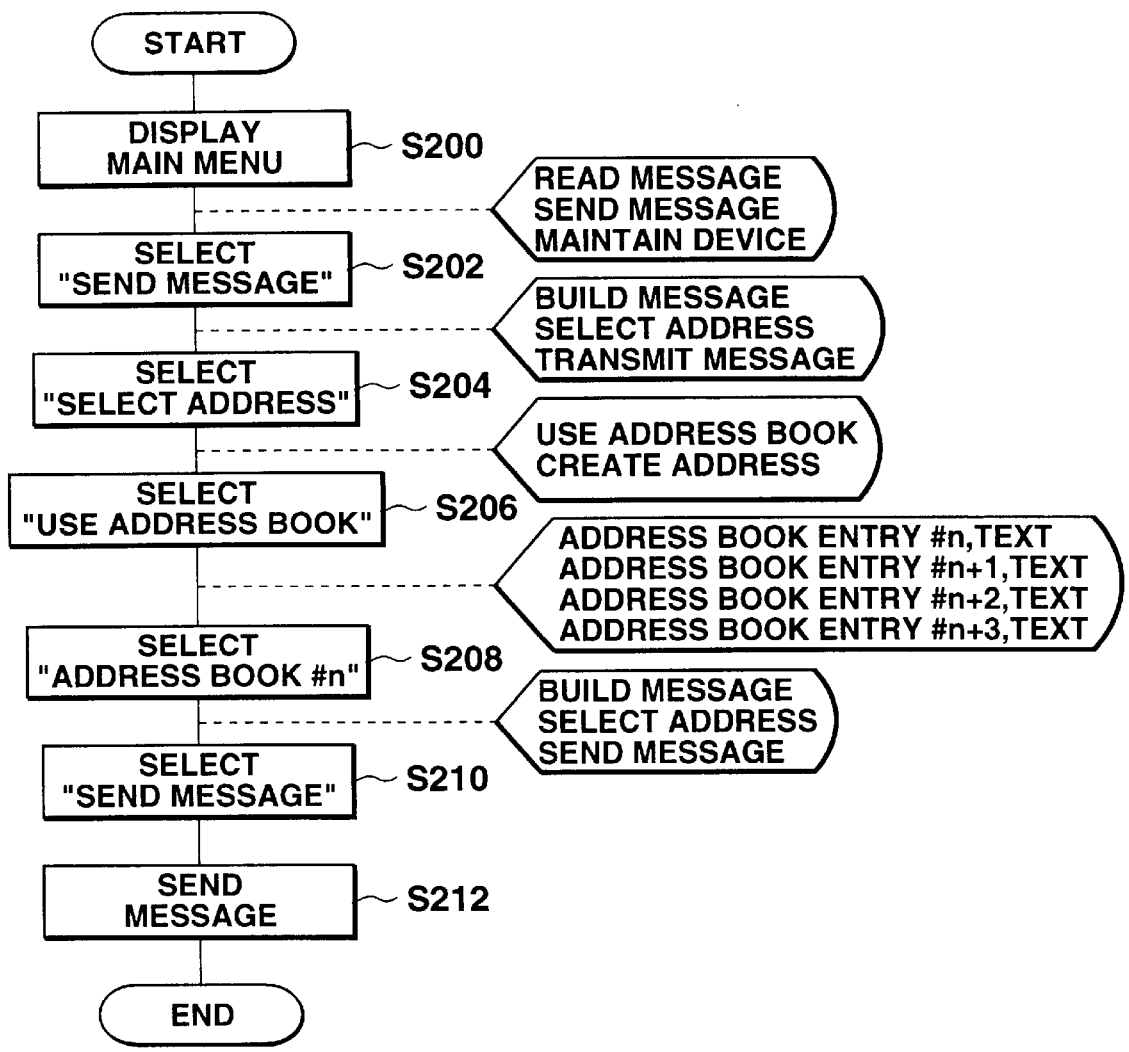
FIG. 17 shows a detailed flowchart showing a change in a menu display in a "send message" procedure.

The detailed process to send a message will be described with reference to the flowchart shown in FIG. 17.

When the user starts the paging device, the main menu is displayed at step S200. The screen displays: READ MESSAGE, SEND MESSAGE, MAINTAIN DEVICE.

The user invokes the function-2 button 22 to select SEND MESSAGE at step S202. The screen displays: BUILD MESSAGE, SELECT ADDRESS, TRANSMIT MESSAGE.

The user invokes the function-2 button 22 to select SELECT ADDRESS at step S204. The screen displays: USE ADDRESS BOOK, CREATE ADDRESS.

The user invokes the function-1 button 20 to select USE ADDRESS BOOK at step S206. The screen displays: ADDRESS BOOK ENTRY #N; TEXT, ADDRESS BOOK ENTRY #N+I; TEXT, ADDRESS BOOK ENTRY #N+2; TEXT, ADDRESS BOOK ENTRY #N+3; TEXT. "ADDRESS BOOK ENTRY #N; TEXT" indicates that the text portion of entry #N of the address book is displayed.

The user invokes the function-1 button 20 to select ADDRESS BOOK ENTRY #N; TEXT at step S208. The screen displays: BUILD MESSAGE, SELECT MESSAGE, SEND MESSAGE.

The user invokes the function-2 button 24 to select SEND MESSAGE at step S210. The message is then transmitted to the base station through the transmitter 52 and the antenna 50 at step S212. The screen display returns to the main menu.

Figure 18:
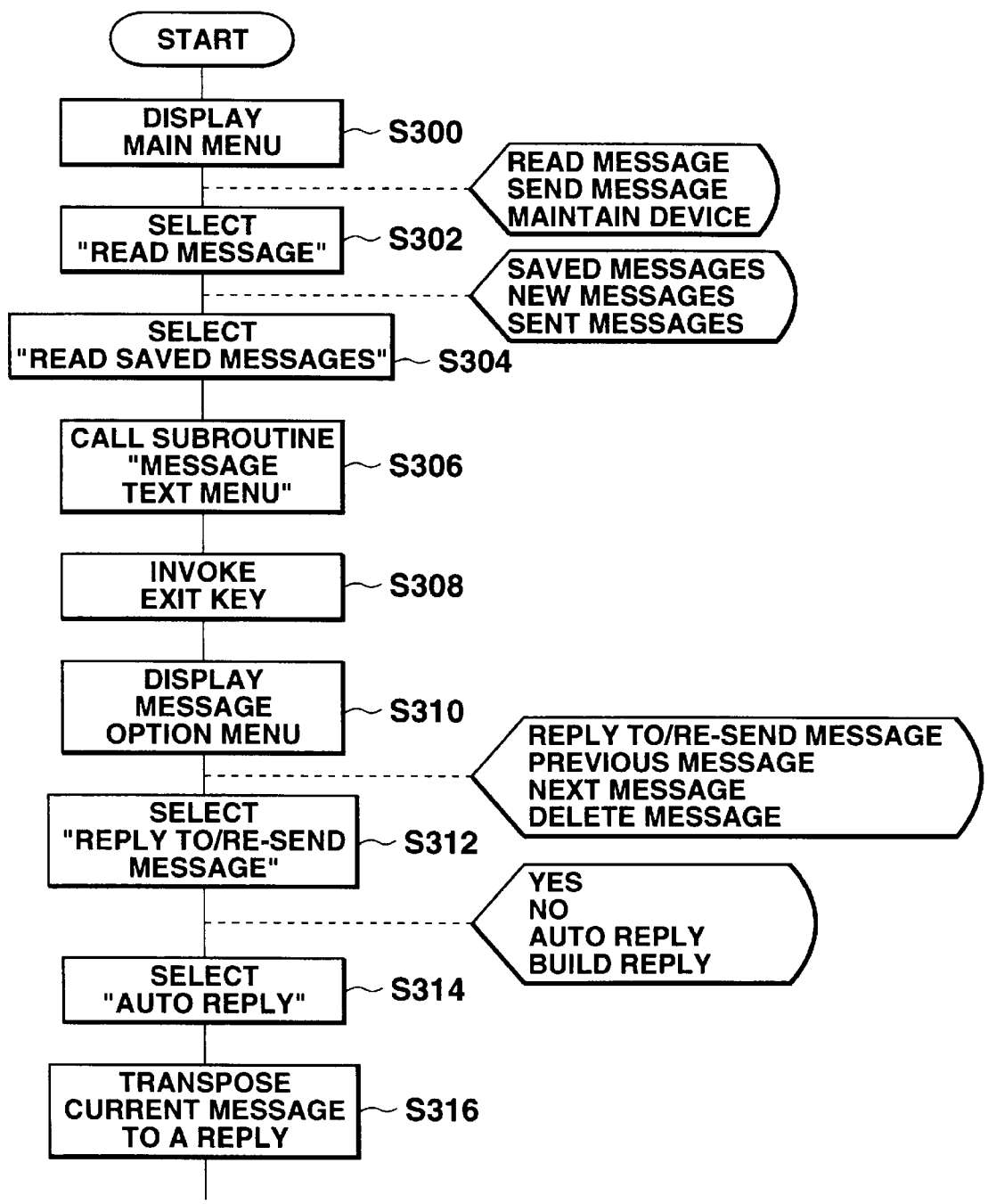
FIG. 18 shows a detailed flowchart showing a change in a menu display in a "read message" procedure.
Figure 19:
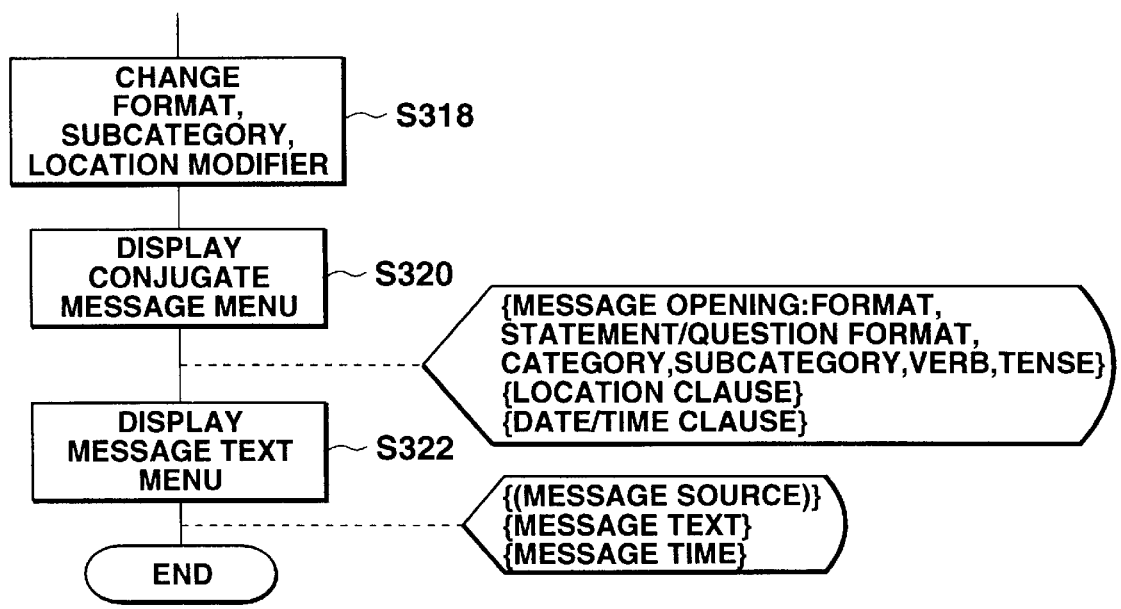
FIG. 19 shows a detailed flowchart showing a change in a menu display in a "read message" procedure.
Figure 20:
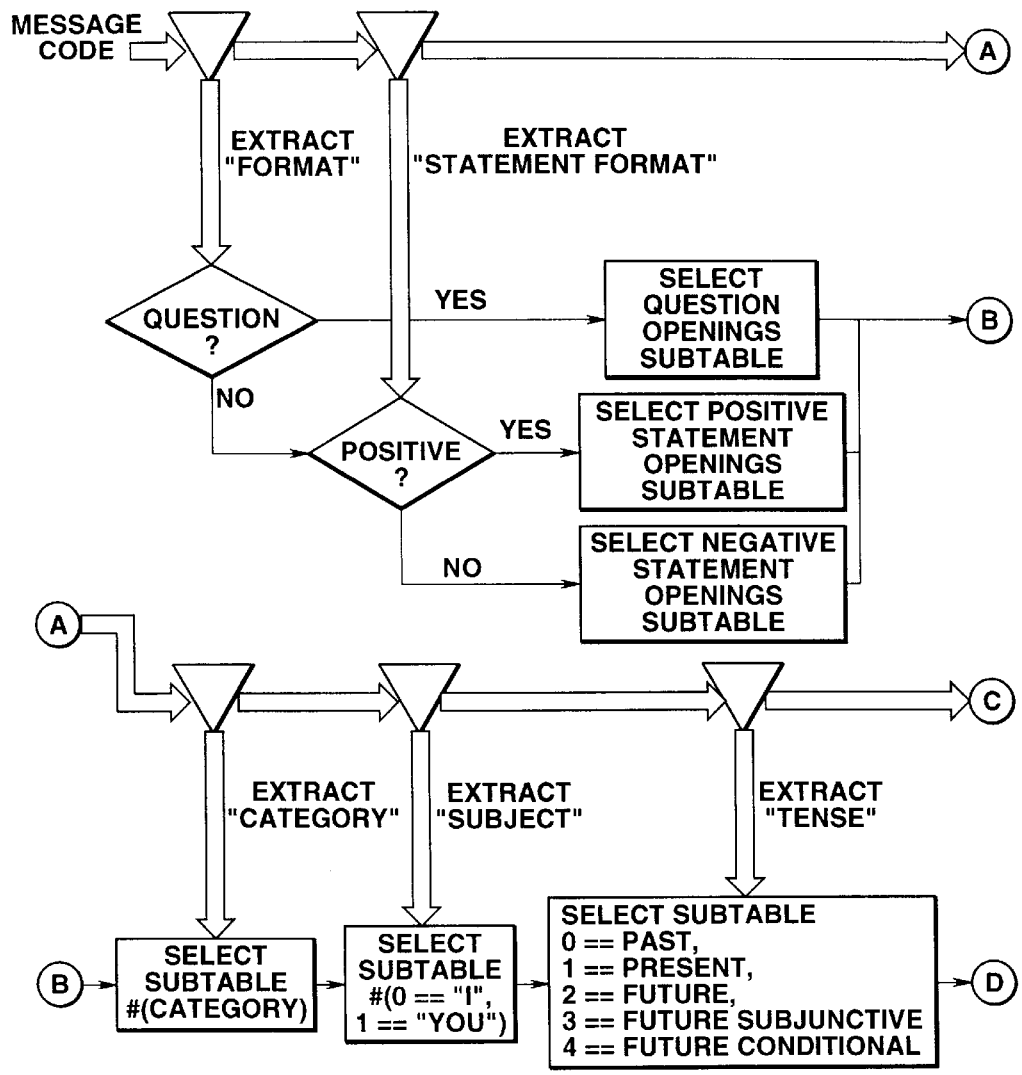
FIG. 20 shows a detailed flowchart showing a "display" process.
Figure 21:
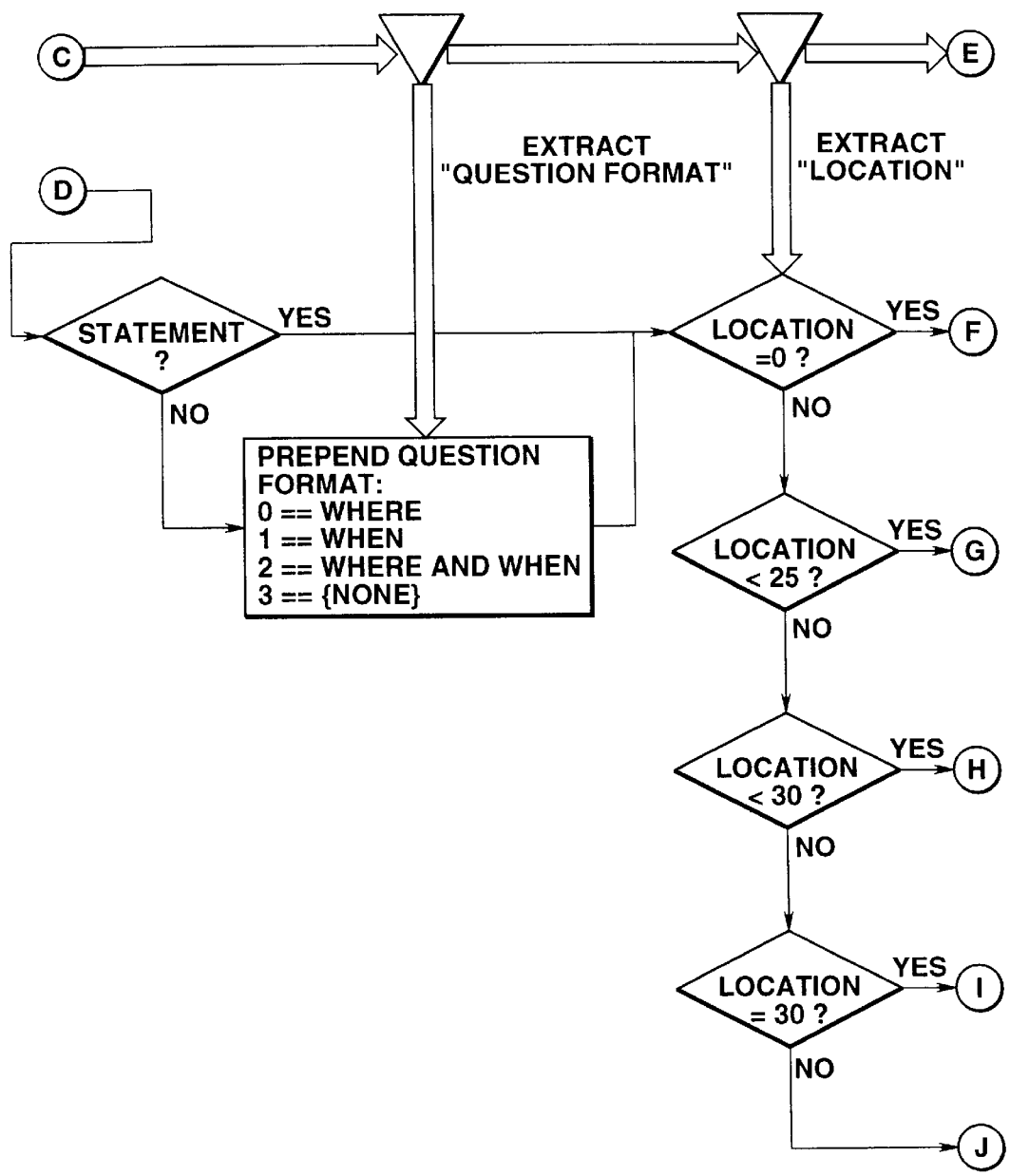
FIG. 21 shows a detailed flowchart showing a "display" process.
Figure 22:
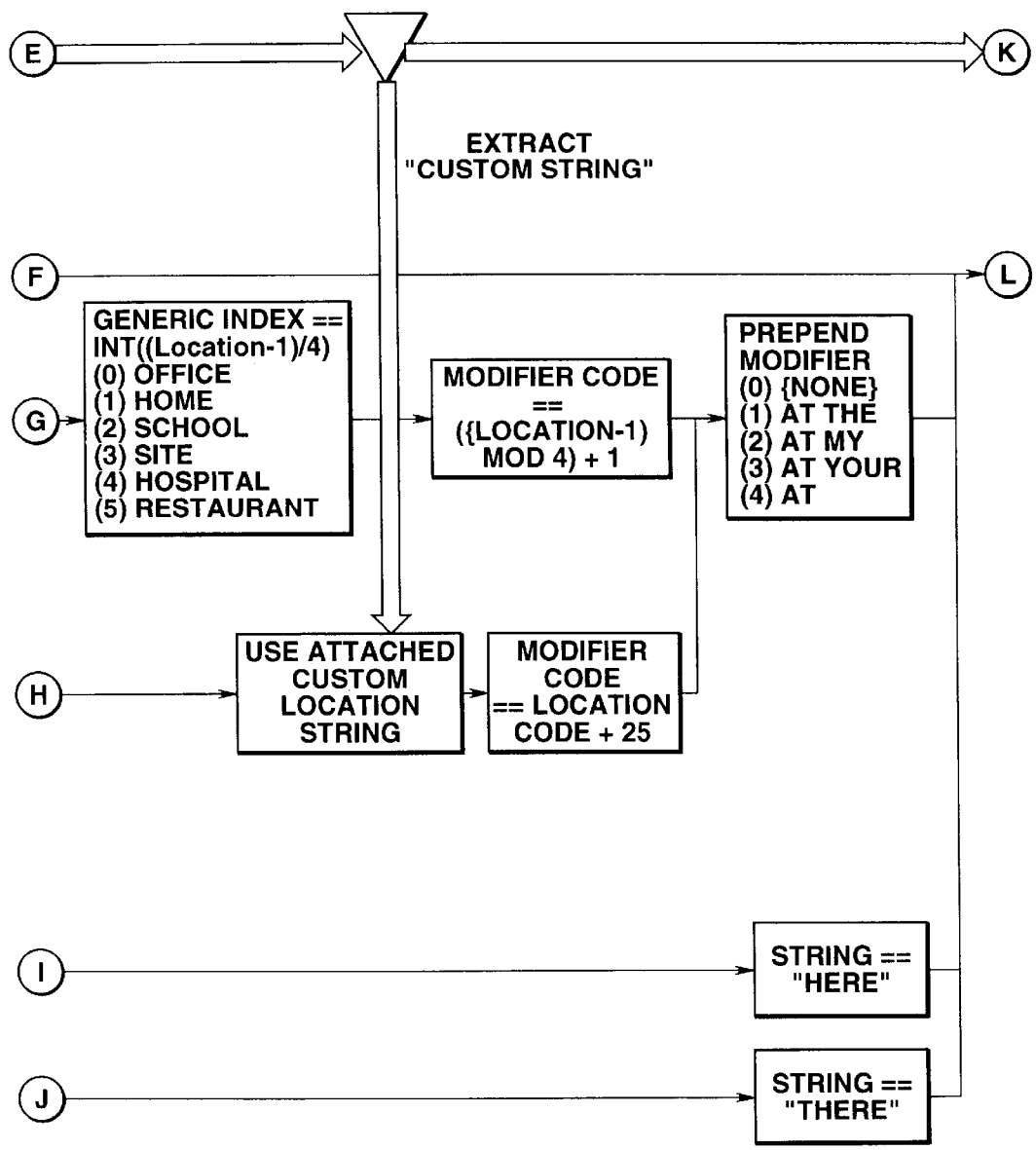
FIG. 22 shows a detailed flowchart showing a "display" process.
Figure 23:
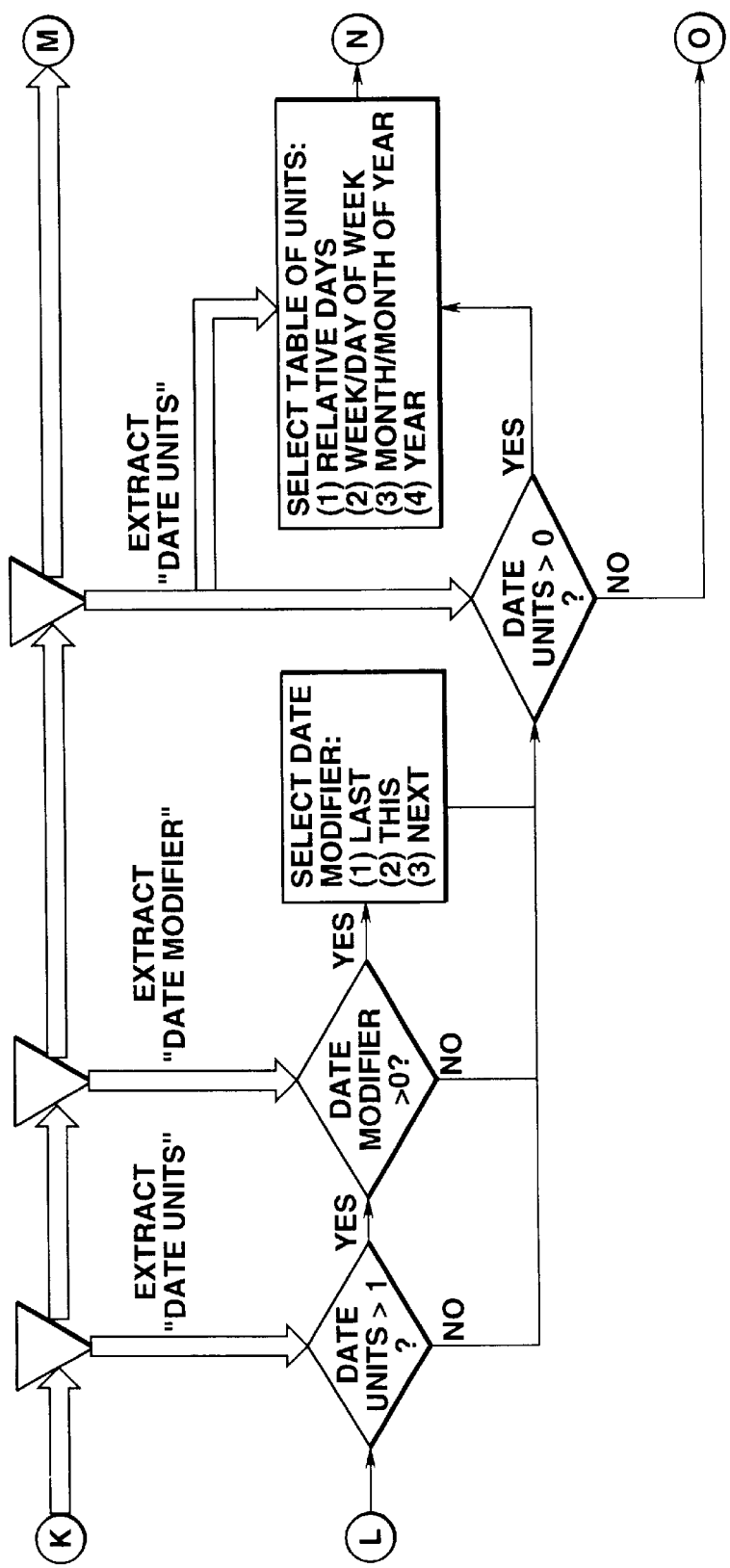
FIG. 23 shows a detailed flowchart showing a "display" process.
Figure 24:
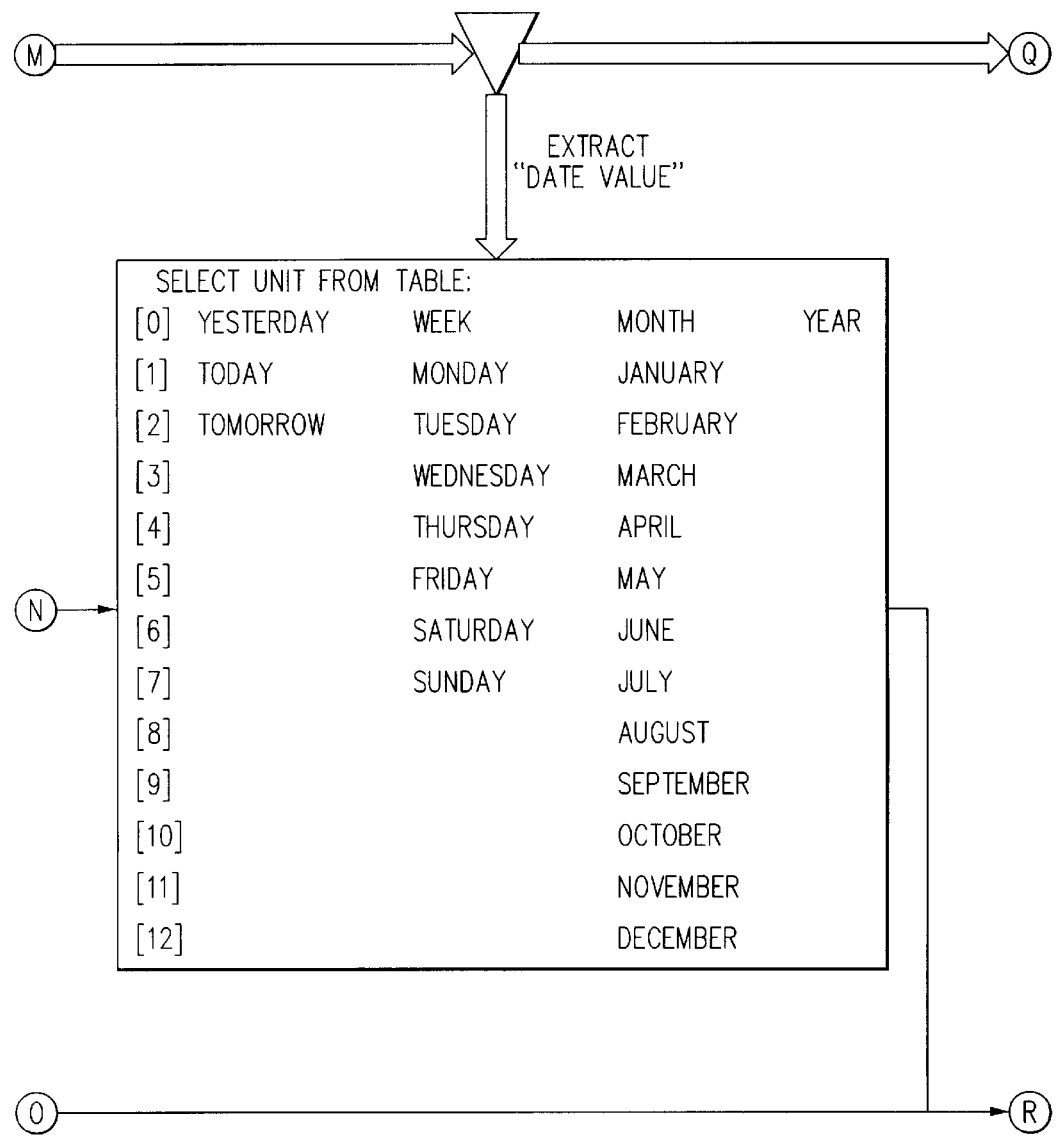
FIG. 24 shows a detailed flowchart showing a "display" process.
Figure 25:
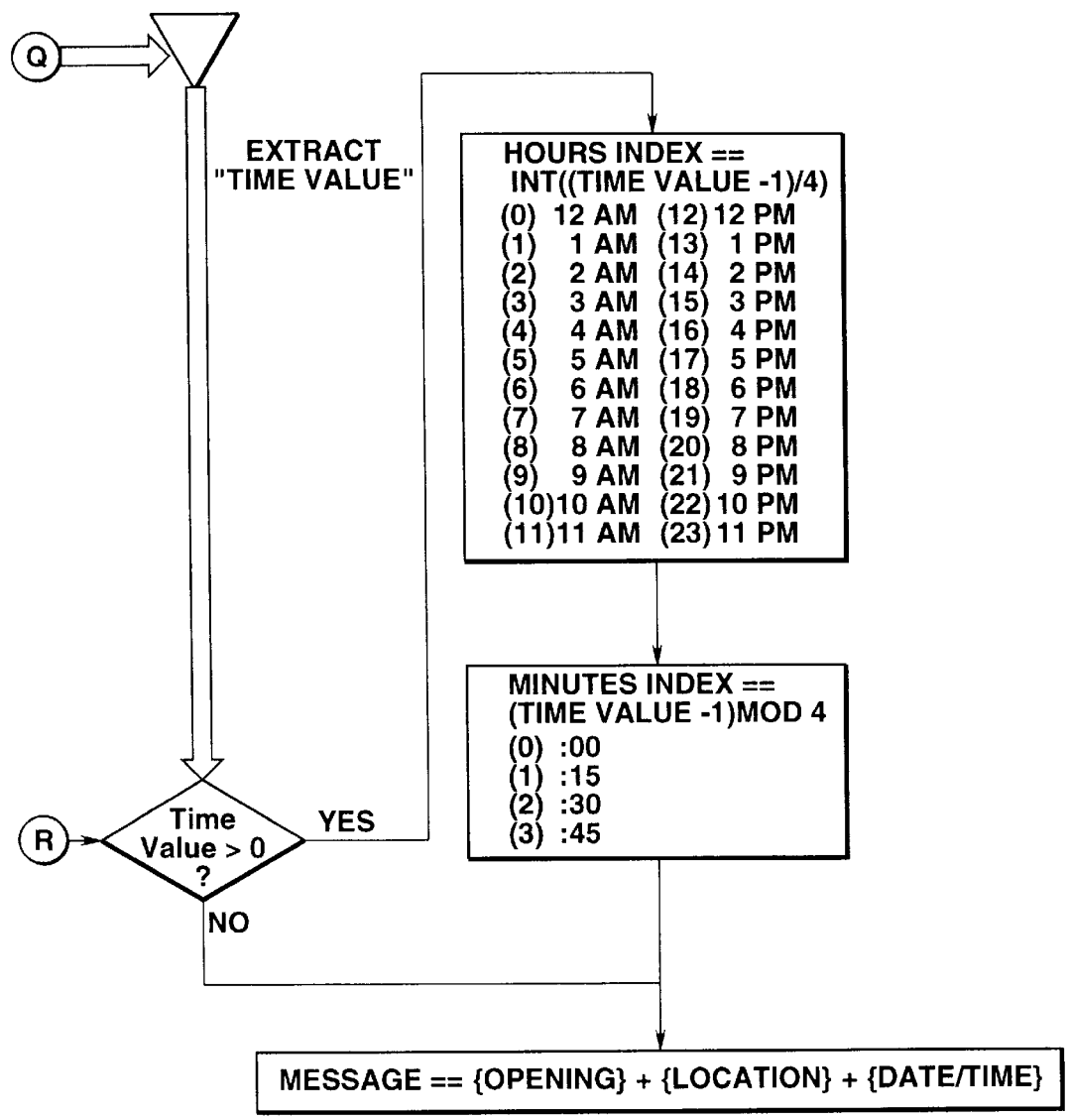
FIG. 25 shows a detailed flowchart showing a "display" process.

The detailed process to reply to a message will be described with reference to the flowchart shown in FIGS. 18 and 19.

When the user starts the paging device, the main menu is displayed at step S300. The screen displays: READ MESSAGE, SEND MESSAGE, MAINTAIN DEVICE.

The user invokes the function-1 button 20 to select READ MESSAGE at step S302. The screen displays: READ SAVED MESSAGES, READ NEW MESSAGES, READ SENT MESSAGES.

The user invokes the function-1 button 20 to select READ SAVED MESSAGES at step S304. At step S306, a subroutine "message text menu" is called. The user invokes the exit button 234 at step S308. At step S310, a "message option menu" is displayed. The screen displays: REPLY TO/RESEND MESSAGE, PREVIOUS MESSAGE, NEXT MESSAGE, DELETE MESSAGE.

Optionally, before step S306, a "message summary menu" could be inserted, which presents the user with a list of messages to choose from. Each message would be presented as a short "summary", displaying just the first few words of each message. One such summary would be displayed on each line; the user would select one of the message summaries using the function buttons, and processing would continue to step S306, as described.

The user invokes the function-1 button 20 to select REPLY TO/RE-SEND MESSAGE at step S312. The screen displays: YES, NO, AUTO REPLY, BUILD REPLY. If YES is selected, a simple Yes/affirmative reply is sent. The message is automatically constructed, and control passes to a transmit message menu. After the message is transmitted, control returns to a message text menu. If NO is selected, a simple No/negative reply is sent. The message is automatically constructed, and control passes to the Transmit message Menu. After the message is transmitted, control returns to the message Text Menu. If the AUTO REPLY is selected, the characteristic of the built message coding mechanism is used to transpose the received message to an appropriate reply. Control passes to the conjugate message menu, where any desired changes to the reply can be made. After the changes are made (using the same techniques as in a message building process), control passes to the transmit message menu, after which control returns to the message text menu. If BUILD REPLY is selected, a reply is built from scratch. Control passes to the build message menu. After the message is complete, control passes to transmit message menu, and subsequently back to message text menu.

The user invokes the function-3 button 24 to select AUTO REPLY at step S314. At step S316, the current message is transposed to a reply. At step S318, the format, subcategory, and location modifier are changed. At step S320, the conjugate message menu is displayed. The screen displays: {MESSAGE OPENING: FORMAT, STATEMENT/QUESTION FORMAT, CATEGORY, SUBCATEGORY, VERB TENSE}, {LOCATION CLAUSE}, {DATE/TIME CLAUSE}. The use of the braces ("{}") indicates that the text portion corresponding to the included codes is displayed. At step S322, a message text menu is displayed. The screen displays: {MESSAGE SOURCE}, {MESSAGE TEXT}, {MESSAGE TIME}.

The details of MAINTAIN DEVICE in the main menu will be described. The processes to maintain the unit are as follows:

1) Press the function-3 button 24 to select MAINTAIN DEVICE.
2) To maintain the address book, press the function-1 button 20 corresponding to ADDRESS BOOK.
3) To view entries, press the function-1 button 20 corresponding to VIEW ENTRIES. The display shows the name and number associated with an address book entry, and displays: DELETE? on display line-4.

If more entries are available (as indicated by the presence of scroll up or scroll down arrows), press the up button 30 or down button 32 to view more entries.

4) Press function-4 button 26 to delete the current entry.

5) To add entries, press the function-2 button 22 corresponding to ADD ENTRY.

6) Follow the text and number entry procedure to create a new address book entry.

7) To sort entries, press the function-3 button 24 corresponding to SORT ENTRIES.

8) Press the exit/enter button 34 when finished the maintaining device procedure.

FIGS. 20 to 25 show flowcharts illustrating the display process.

Other embodiments of the present invention will be described below. Embodiments of the present invention other than in a paging device or system are possible. One such is a software simulation of a paging device, encoded to allow the software to interact and perform on a hardware machine such as a personal computer (PC). The software simulation may also form the basis for a PC-based subscriber front-end for an overall Paging system.

In applications which allow for larger data bandwidth to be used the size of the coding table may be increased to cover more options while retaining the advantages of the meaning-based encoding.

Another embodiment of the present invention is its application from within a computer device. Given the multitude of different computer platforms and hardware models, the user interface can be designed to be used in accordance with any particular computer system.

For example, using a personal computer running the MICROSOFT WINDOWS (trademark) interface, a software simulation program based upon the paging coding mechanism runs under the MICROSOFT WINDOWS system. Its basic appearance is a graphical interface similar to the interface described for a portable paging device but where the function buttons, up/down buttons, exit/enter button are now part of the screen display and activated through the use of a keyboard or a mouse pointing device that are attached peripherally to the computer.

The buttons are selected using a pointing device such as a mouse, and the various responses and choices appear on the display similar to the above embodiment.

In general, choices are made by selecting a function button that corresponds to the line of the display where a desired selection appears. If more choices are available, then this is indicated with the up and down scroll arrows either on the display screen or on another input device such as a keyboard.

To create a message, the codes illustrated in FIGS. 3 to 6 must be set by the user, by following a series of prompts and menus. First, a category is selected. If the user does not select a category, then the build message process terminates. Otherwise, the user is requested to select whether the message is a statement or a question. If the user selects the exit button 34, control is returned. If the user has selected a question, then one of an available list of question formats is selected. At this point, the subcategory, if appropriate, of the sentence/message is selected. Finally, in the case of a statement message, the choice of a Positive or Negative sense is presented.

The information selected at this point is sufficient to display the message as a complete sentence, in whatever language is currently being used (English, in this example). As the screen displays the conjugate submenu, this presents an opportunity to enter more information, such as verb tense, a location clause and a day/date clause. When the message/sentence is complete, the routine/process returns the coded information to the level which called on its services.

For a message about actions, as opposed to things (e.g., telephone calls as opposed to packages), the user is presented with a further choice of subcategory for the message. The choice is presented in the form of an inquiry, with the available selections displayed on separate lines of the display. The user selects the appropriate row button, or selects EXIT to terminate the process. The user input is saved as the subcategory value, and control is passed to the next step in the build message process.

Sufficient choices have been made by the user (category, format, question/ statement format and subcategory) to allow for the message to be displayed as ASCII text, using defaults for the values as yet unspecified. The defined and defaulted codes are passed to the display message process (described above) to be converted to ASCII text, and the result is displayed. The display sentence of CAN THE MEETING BE AT MY OFFICE NEXT TUESDAY @2:00 PM? is an example of the result of this process. The main clause is displayed on the first line of the display, and subsequent lines are used to present the result of the location clause and date/time clause parts of the message.

Changes to the location clause portion of the message are made through another menu. The row buttons are used to select a type of location from the list displayed. Choices of RELATIVE, GENERIC, CUSTOM SELECTION are available. Each can also be modified with a prefix such as AT THE or AT MY. The selection made is returned as the location clause value, and control is returned.

Changes to the date/time clause portion of the message are made through another menu. First, a choice is made to modify either the date or time part of the clause. The date clause has available choices. Choices of RELATIVE DAY, DAY OF WEEK, MONTH OF YEAR, YEAR are available. Most can be further modified by adding a prefix of LAST, THIS, NEXT. The selections are saved as the date modifier, date unit and date value values. Similarly, the time part of the date/time clause can be set. The choices made here are saved as the time modifier, time hours, and time minutes values.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. Message communication terminal device comprising:

means for storing a data table denoting a relationship between a plurality of message defining data and corresponding codes, the plurality of message defining data including a plurality of category data indicative of a category of a message and a plurality of grammatical data indicative of a grammatical feature of a message;

means for displaying the plurality of category data and the plurality of grammatical data included in the first data table;

means for selecting several category data and several grammatical data among the plurality of category data and the plurality of grammatical data displayed by said displaying means;

means for transmitting a series of codes corresponding to the several category data and the several grammatical data selected by said selecting means;

means for receiving a series of codes transmitted from another device; and means for converting the series of codes received by said receiving means into a message with reference to the data table.

2. The device according to claim 1, in which said message defining data includes format data indicating whether the message is a statement or a question.

3. The device according to claim 1, in which said message defining data includes tense data indicative of a tense of verb of the message.

4. The device according to claim 1, in which said message defining data includes time data indicative of time specified by the message.

5. The device according to claim 1, in which said message defining data includes location data indicative of location specified by the message.

6. The device according to claim 1, in which said displaying means comprises a display screen including plural lines and said selecting means comprises plural keys corresponding to the plural lines of the display screen.

7. The device according to claim 6, in which said displaying means comprises a display screen including plural lines for displaying format, statement/question format, category, subcategory, verb tense, location clause, date/time clause, and means for changing contents of display in response to an interactive operation.

8. The device according to claim 1, further comprising means for building a reply message by converting a question to a statement.

9. The device according to claim 1, further comprising means for building a reply message by converting a statement to a question.

10. Build message communication system comprising:

a transmitter device for transmitting message defining data including category data indicative of a category of a message and grammatical data indicative of a grammatical feature of the message, the transmitter device comprising:

means for storing a first data table denoting a relationship between a plurality of message defining data and corresponding codes;

means for displaying the plurality of message defining data included in the first data table;

means for selecting several message defining data among the plurality of message defining data displayed by said displaying means; and means for transmitting a series of codes corresponding to the several message defining data selected by said selecting means;

a receiver device for receiving the message defining data transmitted from said transmitter device and reproducing the message based on the message defining data received, the receiver device comprising:

means for storing a second data table denoting the relationship between the plurality of message defining data and the corresponding codes which is indicated by said first data table;

means for receiving the series of codes transmitted from said transmitter device; and means for decoding the series of codes received by said receiving means into a message with reference to the second table.

11. The system according to claim 10, in which said message defining data includes format data indicating whether the message is a statement or a question, and said receiver means comprises means for producing a reply message by converting the format data included in the received message and indicating that the message is a question into format data indicating that the message is a statement.

12. The system according to claim 10, in which said message defining data includes format data indicating whether the message is a statement or a question, and said receiver means comprises means for producing a reply message by converting the format data included in the received message and indicating that the message is a statement into format data indicating that the message is a question.

13. The system according to claim 10, in which said message defining data includes tense data indicative of a tense of verb of the message.

14. The system according to claim 10, in which said message defining data includes time data indicative of time specified by the message.

15. The system according to claim 10, in which said message defining data includes location data indicative of location specified by the message.

16. The system according to claim 10, in which said transmitting device comprises means for conjugating the message.

17. Build message communication system comprising:

a transmitter device for transmitting message defining data including category data indicative of a category of a message and grammatical data indicative of a grammatical feature of the message, the transmitter device comprising:

means for storing a first data table denoting a relationship between a plurality of message defining data in a first language and corresponding codes, the message defining data including category data indicative of a category of a first language message and grammatical data indicative of a grammatical feature of the first language message;

means for displaying the plurality of message defining data included in the first data table;

means for selecting several message defining data among the plurality of message defining data displayed by said displaying means; and means for transmitting a series of codes corresponding to the several message defining data selected by said selecting means;

a receiver device for receiving the message defining data transmitted from said transmitter device and reproducing the message based on the message defining data received, the receiver device comprising:

means for storing a second data table denoting a relationship between a plurality of message defining data in a second language and corresponding codes, the message defining data including category data indicative of a category of a second language message corresponding to the first language message and grammatical data indicative of a grammatical feature of the second language message;

means for receiving the series of codes transmitted from said transmitter device; and means for decoding the series of codes received by said receiving means into a message in the second language with reference to the second table.

* * * * *

UNITED STATES PATENT AND TRADEMARK OFFICE
CERTIFICATE OF CORRECTION

PATENT NO.   : 5,884,248
ISSUE DATE   : March 16, 1999
INVENTOR(S)  : Hall, Tracy R.

It is certified that error appears in the above-identified patent and that said Letters Patent is hereby corrected as shown below:

```
On the title page. item [73]
```
Assignee: Casio Computer Co., Ltd.
   Tokyo, Japan Signed and Sealed this Fourth Day of January, 2000

Attest:

Attesting Officer

*Acting Commissioner of Patents and Trademarks*